(12) United States Patent
Zhamu et al.

(10) Patent No.: US 11,742,475 B2
(45) Date of Patent: Aug. 29, 2023

(54) ENCAPSULATED ANODE ACTIVE MATERIAL PARTICLES, LITHIUM SECONDARY BATTERIES CONTAINING SAME, AND METHOD OF MANUFACTURING

(71) Applicant: Nanotek Instruments Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 0 days.

(21) Appl. No.: 15/478,125

(22) Filed: Apr. 3, 2017

(65) Prior Publication Data
US 2018/0287142 A1    Oct. 4, 2018

(51) Int. Cl.
*H01M 4/36* (2006.01)
*H01M 4/62* (2006.01)
(Continued)

(52) U.S. Cl.
CPC ........... *H01M 4/366* (2013.01); *H01M 4/386* (2013.01); *H01M 4/622* (2013.01); *H01M 4/625* (2013.01);
(Continued)

(58) Field of Classification Search
CPC ........ H01M 4/13; H01M 4/624; H01M 4/667; H01M 4/64; H01M 4/29; H01M 4/62;
(Continued)

(56) References Cited

U.S. PATENT DOCUMENTS 2,798,878 A    7/1957 Hummers
3,836,511 A    9/1974 O'farrell et al.
(Continued)

FOREIGN PATENT DOCUMENTS

CN    101383408 A    3/2009
CN    102317348 A    1/2012
(Continued)

OTHER PUBLICATIONS

KR and Machine Translation of KR-1020150044333.*
(Continued)

*Primary Examiner* — Stephen J Yanchuk

(57) ABSTRACT

Provided is particulate of an anode active material for a lithium battery, comprising one or a plurality of anode active material particles being embraced or encapsulated by a thin layer of a high-elasticity polymer having a recoverable tensile strain no less than 5%, a lithium ion conductivity no less than $10^{-6}$ S/cm at room temperature, and a thickness from 0.5 nm to 10 μm, wherein the polymer contains an ultrahigh molecular weight (UHMW) polymer having a molecular weight from $0.5 \times 10^6$ to $9 \times 10^6$ grams/mole. The UHMW polymer is preferably selected from polyacrylonitrile, polyethylene oxide, polypropylene oxide, polyethylene glycol, polyvinyl alcohol, polyacrylamide, poly(methyl methacrylate), poly(methyl ether acrylate), a copolymer thereof, a sulfonated derivative thereof, a chemical derivative thereof, or a combination thereof.

46 Claims, 10 Drawing Sheets

(51) Int. Cl.
  *H01M 4/38* (2006.01)
  *H01M 4/02* (2006.01)
  *H01M 10/052* (2010.01)

(52) U.S. Cl.
  CPC .......... *H01M 4/626* (2013.01); *H01M 10/052* (2013.01); *H01M 2004/027* (2013.01)

(58) Field of Classification Search
  CPC ...... H01M 4/366; H01M 4/625; H01M 4/626; H01M 10/0525; H01M 2004/027; H01M 2300/0082
  See application file for complete search history.

(56) References Cited

U.S. PATENT DOCUMENTS

| | | | |
|---|---|---|---|
| 4,322,317 A | 3/1982 | Rao et al. | |
| 4,720,910 A | 1/1988 | Rourke et al. | |
| 5,057,339 A | 10/1991 | Ogawa | |
| 5,162,170 A | 11/1992 | Miyabayashi et al. | |
| 5,270,417 A | 12/1993 | Soga et al. | |
| 5,342,710 A | 8/1994 | Koksbang | |
| 5,350,647 A | 9/1994 | Hope et al. | |
| 5,409,785 A | 4/1995 | Nakano et al. | |
| 5,424,151 A | 6/1995 | Koksbang et al. | |
| 5,434,021 A | 7/1995 | Fauteux et al. | |
| 5,460,905 A | 10/1995 | Skotheim | |
| 5,536,599 A | 7/1996 | Alamgir et al. | |
| 5,648,187 A | 7/1997 | Skotheim | |
| 5,961,672 A | 10/1999 | Skotheim et al. | |
| 6,025,094 A | 2/2000 | Visco et al. | |
| 6,218,055 B1 | 4/2001 | Shah et al. | |
| 6,447,952 B1 | 9/2002 | Spiegel et al. | |
| 6,451,484 B1 | 9/2002 | Han et al. | |
| 6,475,678 B1 | 11/2002 | Suzuki | |
| 6,515,101 B1 | 2/2003 | Sheares | |
| 6,620,547 B1 | 9/2003 | Sung et al. | |
| 6,733,924 B1 | 5/2004 | Skotheim et al. | |
| 6,797,428 B1 | 9/2004 | Skotheim et al. | |
| 6,936,381 B2 | 8/2005 | Skotheim et al. | |
| 7,247,408 B2 | 7/2007 | Skotheim et al. | |
| 7,282,295 B2 | 10/2007 | Visco et al. | |
| 7,282,296 B2 | 10/2007 | Visco et al. | |
| 7,282,302 B2 | 10/2007 | Visco et al. | |
| 7,618,678 B2 | 11/2009 | Mao et al. | |
| 8,597,828 B2 | 12/2013 | Martinet et al. | |
| 9,905,856 B1 | 2/2018 | Zhamu et al. | |
| 10,084,182 B2 | 9/2018 | Pan et al. | |
| 10,483,533 B2 | 11/2019 | Zhamu et al. | |
| 10,629,899 B1 | 4/2020 | Jang | |
| 2002/0034685 A1 | 3/2002 | Sato et al. | |
| 2002/0182488 A1 | 12/2002 | Cho et al. | |
| 2002/0195591 A1 | 12/2002 | Ravet et al. | |
| 2003/0180619 A1 | 9/2003 | Tamura et al. | |
| 2004/0018430 A1 | 1/2004 | Holman et al. | |
| 2005/0034993 A1 | 2/2005 | Gozdz et al. | |
| 2005/0042515 A1 | 2/2005 | Hwang et al. | |
| 2005/0095504 A1 | 5/2005 | Kim et al. | |
| 2005/0098914 A1 | 5/2005 | Varma et al. | |
| 2005/0118508 A1 | 6/2005 | Yong et al. | |
| 2005/0136330 A1 | 6/2005 | Mao et al. | |
| 2006/0263697 A1 | 11/2006 | Dahn et al. | |
| 2007/0020522 A1 | 1/2007 | Obrovac et al. | |
| 2007/0059600 A1 | 3/2007 | Kim et al. | |
| 2007/0122700 A1 | 5/2007 | Miyachi et al. | |
| 2007/0218369 A1 | 9/2007 | Kaiduka et al. | |
| 2007/0289879 A1 | 12/2007 | Horton | |
| 2008/0248393 A1 | 10/2008 | Richard et al. | |
| 2008/0318128 A1 | 12/2008 | Simoneau et al. | |
| 2009/0136846 A1 | 5/2009 | Lee et al. | |
| 2009/0155676 A1 | 6/2009 | Zhamu et al. | |
| 2009/0169725 A1 | 7/2009 | Zhamu et al. | |
| 2009/0186093 A1 | 7/2009 | Liu et al. | |
| 2010/0099029 A1 | 4/2010 | Kinoshita et al. | |
| 2010/0112454 A1 | 5/2010 | Visco et al. | |
| 2010/0143798 A1 | 6/2010 | Zhamu et al. | |
| 2010/0173198 A1 | 7/2010 | Zhamu et al. | |
| 2011/0027658 A1 | 2/2011 | Kim et al. | |
| 2011/0059361 A1 | 3/2011 | Wilkening et al. | |
| 2011/0104571 A1 | 5/2011 | Zhamu et al. | |
| 2011/0143211 A1 | 6/2011 | Takeyama | |
| 2011/0177388 A1 | 7/2011 | Bae et al. | |
| 2011/0244337 A1 | 10/2011 | Ohta et al. | |
| 2011/0262816 A1 | 10/2011 | Amatucci | |
| 2012/0058397 A1 | 3/2012 | Zhamu et al. | |
| 2012/0064409 A1* | 3/2012 | Zhamu .................. | B82Y 30/00 429/221 |
| 2012/0070708 A1 | 3/2012 | Ohira et al. | |
| 2012/0070746 A1 | 3/2012 | Mikhaylik et al. | |
| 2012/0088154 A1 | 4/2012 | Liu et al. | |
| 2013/0052544 A1 | 2/2013 | Ohkubo et al. | |
| 2013/0054061 A1 | 2/2013 | Nishimoto | |
| 2013/0122373 A1 | 5/2013 | Tamura et al. | |
| 2013/0157141 A1 | 6/2013 | Zhong et al. | |
| 2013/0164615 A1 | 6/2013 | Manthiram et al. | |
| 2013/0171339 A1 | 7/2013 | Wang et al. | |
| 2013/0224603 A1 | 8/2013 | Chen et al. | |
| 2013/0292613 A1 | 11/2013 | Wegner et al. | |
| 2014/0045065 A1 | 2/2014 | Bao et al. | |
| 2014/0072879 A1 | 3/2014 | Chen et al. | |
| 2014/0097380 A1 | 4/2014 | Wu et al. | |
| 2014/0147738 A1 | 5/2014 | Chen et al. | |
| 2014/0147751 A1* | 5/2014 | Yang .................... | H01M 4/133 429/231.8 |
| 2014/0154572 A1 | 6/2014 | Singh et al. | |
| 2014/0162121 A1 | 6/2014 | Ryu et al. | |
| 2014/0178747 A1 | 6/2014 | Tsai et al. | |
| 2014/0234702 A1 | 8/2014 | Zhang et al. | |
| 2014/0235513 A1 | 8/2014 | Kverel et al. | |
| 2014/0255785 A1 | 9/2014 | Do et al. | |
| 2014/0342238 A1 | 11/2014 | Lee et al. | |
| 2014/0363746 A1 | 12/2014 | He et al. | |
| 2015/0044556 A1 | 2/2015 | Wang et al. | |
| 2015/0044564 A1 | 2/2015 | Wang et al. | |
| 2015/0064568 A1 | 3/2015 | Yushin et al. | |
| 2015/0064574 A1 | 3/2015 | He et al. | |
| 2015/0079485 A1 | 3/2015 | Choi et al. | |
| 2015/0162641 A1 | 6/2015 | Visco et al. | |
| 2015/0180000 A1 | 6/2015 | Roumi | |
| 2015/0180037 A1 | 6/2015 | Gronwald et al. | |
| 2015/0218323 A1 | 8/2015 | Kim et al. | |
| 2015/0221935 A1 | 8/2015 | Zhou et al. | |
| 2015/0236372 A1 | 8/2015 | Yushin et al. | |
| 2015/0244025 A1 | 8/2015 | Rhee et al. | |
| 2015/0263382 A1 | 9/2015 | Singh et al. | |
| 2015/0318532 A1 | 11/2015 | Manthiram et al. | |
| 2015/0318555 A1 | 11/2015 | Oku et al. | |
| 2015/0325844 A1 | 11/2015 | Inoue | |
| 2015/0372294 A1 | 12/2015 | Minami et al. | |
| 2016/0013481 A1 | 1/2016 | Jeong et al. | |
| 2016/0043384 A1 | 2/2016 | Zhamu et al. | |
| 2016/0043409 A1 | 2/2016 | Park et al. | |
| 2016/0087266 A1 | 3/2016 | Muldoon et al. | |
| 2016/0126543 A1 | 5/2016 | Ota et al. | |
| 2016/0149216 A1 | 5/2016 | Mizuno et al. | |
| 2016/0181585 A1 | 6/2016 | Choi et al. | |
| 2016/0181611 A1 | 6/2016 | Cho et al. | |
| 2016/0204431 A1 | 7/2016 | Sawa | |
| 2016/0218341 A1 | 7/2016 | Kumar et al. | |
| 2016/0240896 A1 | 8/2016 | Zhang et al. | |
| 2016/0248086 A1 | 8/2016 | Ohsawa et al. | |
| 2016/0260966 A1 | 9/2016 | Ohsawa et al. | |
| 2016/0301075 A1 | 10/2016 | Zhamu et al. | |
| 2016/0310924 A1 | 10/2016 | Nakatomi et al. | |
| 2016/0329567 A1 | 11/2016 | Lee et al. | |
| 2016/0336625 A1 | 11/2016 | Jeong et al. | |
| 2016/0344033 A1 | 11/2016 | Kasamatsu et al. | |
| 2016/0344035 A1 | 11/2016 | Zhamu et al. | |
| 2016/0351877 A1 | 12/2016 | Kusachi et al. | |
| 2016/0351909 A1 | 12/2016 | Bittner et al. | |
| 2016/0372743 A1 | 12/2016 | Cho et al. | |
| 2016/0372784 A1 | 12/2016 | Hayner et al. | |
| 2017/0002154 A1 | 1/2017 | Hiasa et al. | |
| 2017/0005367 A1 | 1/2017 | Berkel et al. | |

(56) References Cited

U.S. PATENT DOCUMENTS

| | | |
|---|---|---|
| 2017/0005369 A1 | 1/2017 | Nakagawa et al. |
| 2017/0018799 A1 | 1/2017 | Jeong |
| 2017/0033347 A1* | 2/2017 | Murakami ........ H01M 10/0568 |
| 2017/0033357 A1 | 2/2017 | Cho et al. |
| 2017/0047584 A1 | 2/2017 | Hwang et al. |
| 2017/0062827 A1* | 3/2017 | Bruckmeier .......... H01M 4/386 |
| 2017/0062830 A1 | 3/2017 | Bao et al. |
| 2017/0062869 A1 | 3/2017 | Zhamu et al. |
| 2017/0092915 A1 | 3/2017 | Ku et al. |
| 2017/0092986 A1 | 3/2017 | Ogawa et al. |
| 2017/0098824 A1 | 4/2017 | Fasching et al. |
| 2017/0098856 A1 | 4/2017 | Zhamu et al. |
| 2017/0104204 A1 | 4/2017 | Zhamu et al. |
| 2017/0104217 A1 | 4/2017 | Yu et al. |
| 2017/0117535 A1 | 4/2017 | Yoon et al. |
| 2017/0117538 A1 | 4/2017 | Bendimerad et al. |
| 2017/0117589 A1 | 4/2017 | Tajima et al. |
| 2017/0141387 A1 | 5/2017 | Hayner et al. |
| 2017/0141399 A1 | 5/2017 | Lux et al. |
| 2017/0162868 A1 | 6/2017 | Kim et al. |
| 2017/0166722 A1 | 6/2017 | Zhamu et al. |
| 2017/0179468 A1 | 6/2017 | Fanous et al. |
| 2017/0194640 A1 | 7/2017 | Bucur et al. |
| 2017/0194648 A1 | 7/2017 | Bucur et al. |
| 2017/0200943 A1 | 7/2017 | Kawakami |
| 2017/0207484 A1 | 7/2017 | Zhamu et al. |
| 2017/0244098 A1 | 8/2017 | Duong et al. |
| 2017/0279125 A1* | 9/2017 | Ohsawa ................ H01M 4/668 |
| 2017/0288211 A1 | 10/2017 | Zhamu et al. |
| 2017/0294643 A1 | 10/2017 | Burshtain et al. |
| 2017/0309517 A1 | 10/2017 | Lee et al. |
| 2017/0324097 A1 | 11/2017 | Lee et al. |
| 2017/0338472 A1 | 11/2017 | Zhamu et al. |
| 2017/0338474 A1* | 11/2017 | Lee ....................... H01M 4/134 |
| 2017/0338490 A1 | 11/2017 | Xiao et al. |
| 2018/0013138 A1 | 1/2018 | Chen et al. |
| 2018/0053978 A1 | 2/2018 | Song et al. |
| 2018/0083265 A1 | 3/2018 | Singh et al. |
| 2018/0190975 A1 | 7/2018 | Ishii et al. |
| 2018/0191026 A1 | 7/2018 | Thielen et al. |
| 2018/0219215 A1 | 8/2018 | Bucur et al. |
| 2018/0233736 A1 | 8/2018 | Zhamu et al. |
| 2018/0241031 A1 | 8/2018 | Pan et al. |
| 2018/0241032 A1 | 8/2018 | Pan et al. |
| 2018/0248173 A1 | 8/2018 | Pan et al. |
| 2018/0248189 A1 | 8/2018 | Pan et al. |
| 2018/0248190 A1 | 8/2018 | Pan et al. |
| 2018/0277829 A1 | 9/2018 | Konishi et al. |
| 2018/0277913 A1 | 9/2018 | Pan et al. |
| 2018/0287142 A1 | 10/2018 | Zhamu et al. |
| 2018/0294475 A1 | 10/2018 | Zhamu et al. |
| 2018/0294476 A1 | 10/2018 | Zhamu et al. |
| 2018/0301707 A1 | 10/2018 | Pan et al. |
| 2019/0051905 A1 | 2/2019 | Zhamu et al. |
| 2019/0058185 A1 | 2/2019 | Lee et al. |
| 2019/0077669 A1 | 3/2019 | Zhamu et al. |
| 2019/0081325 A1 | 3/2019 | Takeda et al. |
| 2019/0088958 A1 | 3/2019 | Viner et al. |
| 2019/0260028 A1 | 8/2019 | Zhamu et al. |
| 2019/0319246 A1 | 10/2019 | Schroeder et al. |
| 2019/0319303 A1 | 10/2019 | Kushida et al. |
| 2019/0386332 A1 | 12/2019 | Zhamu et al. |
| 2019/0393466 A1 | 12/2019 | Lin et al. |
| 2019/0393495 A1 | 12/2019 | He et al. |
| 2019/0393510 A1 | 12/2019 | He et al. |
| 2019/0393543 A1 | 12/2019 | Zhamu et al. |
| 2019/0393562 A1 | 12/2019 | Burshtain et al. |
| 2020/0035969 A1 | 1/2020 | Kondo et al. |
| 2020/0203696 A1 | 6/2020 | Minamida |
| 2020/0243854 A1 | 7/2020 | Jang |
| 2020/0266406 A1 | 8/2020 | Cheng et al. |
| 2020/0295334 A1 | 9/2020 | Seki et al. |
| 2021/0336274 A1 | 10/2021 | Jung et al. |

FOREIGN PATENT DOCUMENTS

| | | |
|---|---|---|
| CN | 103258990 A | 8/2013 |
| CN | 104103809 A | 10/2014 |
| CN | 104812485 A | 7/2015 |
| CN | 105322132 A | 2/2016 |
| CN | 106159313 A | 11/2016 |
| CN | 108899472 A | 11/2018 |
| EP | 2787563 A1 | 10/2014 |
| JP | 1275613 A | 11/1989 |
| JP | 1999007942 A | 1/1999 |
| JP | 2005071998 A | 3/2005 |
| JP | 2010040218 A | 2/2010 |
| JP | 2010160984 A | 7/2010 |
| JP | 2011524611 A | 9/2011 |
| JP | 2015084320 A | 4/2015 |
| JP | 2015176656 A | 10/2015 |
| JP | 2016219411 A | 12/2016 |
| JP | 2017152123 A | 8/2017 |
| KR | 1020030050475 A | 6/2003 |
| KR | 100670527 B1 | 1/2007 |
| KR | 1020100138607 A | 12/2010 |
| KR | 1020110063593 A | 6/2011 |
| KR | 1020140101640 A | 8/2014 |
| KR | 20160052351 A | 5/2016 |
| KR | 1020160085386 A | 7/2016 |
| KR | 1020160087511 A | 7/2016 |
| KR | 1020170001069 U | 3/2017 |
| KR | 1020170086003 A | 7/2017 |
| KR | 1020170126404 A | 11/2017 |
| KR | 1020180035752 A | 4/2018 |
| KR | 1020190024761 A | 3/2019 |
| WO | 2007108424 A1 | 9/2007 |
| WO | 2010115173 A1 | 10/2010 |
| WO | 2015005117 A1 | 1/2015 |
| WO | 2015141799 A1 | 9/2015 |
| WO | 2016015915 A1 | 2/2016 |
| WO | 2017034656 A1 | 3/2017 |
| WO | 2017135794 A1 | 8/2017 |
| WO | 2017172104 A1 | 10/2017 |
| WO | 2017200798 A1 | 11/2017 |
| WO | 2018075538 A1 | 4/2018 |
| WO | 2018148090 A1 | 8/2018 |
| WO | 2018156328 A1 | 8/2018 |
| WO | 2018156329 A1 | 8/2018 |
| WO | 2018191025 A1 | 10/2018 |
| WO | 2020154552 A1 | 7/2020 |

OTHER PUBLICATIONS

An et al., "Diameter-Selected Synthesis of Single Crystalline Trigonal Selenium Nanowires" Materials Chemistry and Physics (2007) vol. 101, No. 2-3, pp. 357-361.

An et al., "Large-Scale Synthesis of High Quality Trigonal Selenium Nanowires" European Journal of Inorganic Chemistry (2003) vol. 17, pp. 3250-3255.

Arai et al., "Versatile supramolecular cross-linker: a rotaxane cross-linker that directly endows vinyl polymers with movable cross-links" Chemistry (2013) vol. 19, pp. 5917-5923.

Buonerba et al., "Novel Synthetic Strategy for the Sulfonation of Polybutadiene and Styrene-Butadiene Copolymers" Macromolecules (2013) vol. 46, pp. 778-784.

Chen et al., "Selenium nanowires and nanotubes synthesized via a facile template-free solution method" Materials Research Bulletin (2010) vol. 45, pp. 699-704.

Dwivedi et al., "An Organic Acid-induced Synthesis and Characterization of Selenium Nanoparticles" Journal of Nanotechnology (2011) Article ID 651971, 6 pages.

Elabd et al., "Sulfonation and Characterization of Poly(styrene-isobutylene-styrene) Triblock Copolymers at High Ion-Exchange Capacities" Polymer (2004) vol. 45, pp. 3037-3043.

Fan et al., "Hollow selenium encapsulated into 3D graphene hydrogels for lithium-selenium batteries with high rate performance and cycling stability" RSC Adv. (2017) vol. 7, pp. 21281-21286.

Gao et al., "Hollow Sphere Selenium Nanoparticles: Their In-Vitro Anti Hydroxyl Radical Effect" Advanced Materials (2002), vol. 14, No. 4, pp. 290-293.

(56) References Cited

OTHER PUBLICATIONS

Ji et al., "A highly ordered nanostructured carbon-sulphur cathode for lithium-sulphur batteries" Nature Materials (2009) vol. 8, pp. 500-506.
Karlicky et al., "Halogenated Graphenes: Rapidly Growing Family of Graphene Derivatives" ACS Nano (2013) vol. 7, No. 8, pp. 6434-6464.
Li et al., "Mixed Surfactant Template Method for Preparation of Nanometer Selenium" E-Journal of Chemistry (2009) vol. 6, No. S1, pp. S304-S310.
Lin et al., "Observation in the Growth of Selenium Nanoparticles" Journal of Chinese Chemical Society (2004) vol. 51, No. 2, pp. 239-242.
Luesakul et al., "Shape-controlled synthesis of cubic-like selenium nanoparticles via the self-assembly method" Carbohydrate Polymers (2016) vol. 153, pp. 435-444.
PCT/US17/18452 International Search Report and Written Opinion dated Apr. 25, 2017, 9 pages.
PCT/US18/16404 International Search Report and Written Opinion dated Apr. 13, 2018, 11 pages.
PCT/US18/16410 International Search Report and Written Opinion dated Apr. 20, 2018, 10 pages.
PCT/US18/16418 International Search Report and Written Opinion dated Apr. 25, 2018, 9 pages.
PCT/US18/16423 International Search Report and Written Opinion dated Apr. 24, 2018, 9 pages.
PCT/US18/16426 International Search Report and Written Opinion dated Apr. 24, 2018, 9 pages.
PCT/US18/16431 International Search Report and Written Opinion dated Apr. 26, 2018, 6 pages.
Xie et al., "A Novel Method for Synthesis of Sulfonated SBS Ionomers by Ring-Opening Reaction of Epoxidized SBS, Their Characterization, Properties, and Blends" Journal of Elastomers and Plastics (2007) vol. 39, pp. 317-334.
Zeng et al., "Solvothermal synthesis of trigonal selenium with butterfly-like microstructure" Particuology (2013) vol. 11, No. 5, pp. 614-617.
Zhang et al., "Synthesis of selenium nanoparticles in the presence of polysaccharides" Materials Letters (2004) vol. 58, No. 21, pp. 2590-2594.
PCT/US18/20892—International Search Report and Written Opinion dated May 2, 2018, 6 pages.
Choi et al., "Highly elastic binders integrating polyrotaxanes for silicon microparticle anodes in lithium ion batteries" Science (2017) vol. 357, No. 6348, pp. 279-283.
Habib et al., "Elastomeric Nanocomposite Based on Exfoliated Graphene Oxide and Its Characteristics without Vulcanization" Hindawi Journal of Nanomaterials (2017) vol. 2017, Article ID 8543137, 11 pages.
Liu et al., "Solutions for the problems of silicon-carbon anode materials for lithium-ion batteries" Royal Society Open Science (2018) vol. 5, p. 172370.
PCT/US18/25135 International Search Report and Written Opinion dated Jun. 27, 2018, 14 pages.
PCT/US18/25150 International Search Report and Written Opinion dated Jun. 29, 2018, 14 pages.
PCT/US18/25160 International Search Report and Written Opinion dated Nov. 21, 2018, 12 pages.
PCT/US18/25163 International Search Report and Written Opinion dated Jul. 27, 2018, 19 pages.
PCT/US18/43421 International Search Report and Written Opinion dated Oct. 11, 2018, 13 pages.
PCT/US18/43435 International Search Report and Written Opinion dated Jan. 7, 2019, 14 pages.
PCT/US19/18931 International Search Report and Written Opinion dated May 8, 2019, 13 pages.
PCT/US19/19061 International Search Report and Written Opinion dated May 13, 2019, 11 pages.
PCT/US19/19062 International Search Report and Written Opinion dated May 13, 2019, 9 pages.
PCT/US19/20214 International Search Report and Written Opinion dated May 2, 2019, 7 pages.
PCT/US19/20222 International Search Report and Written Opinion dated May 3, 2019, 7 pages.
U.S. Appl. No. 14/999,080 Nonfinal Office Action dated Nov. 9, 2018.
U.S. Appl. No. 15/442,803 Nonfinal Office Action dated Dec. 28, 2018, 24 pages.
U.S. Appl. No. 15/442,807 Nonfinal Office Action dated Dec. 14, 2018, 7 pages.
U.S. Appl. No. 15/483,342 Final Office Action dated Mar. 22, 2019, 52 pages.
U.S. Appl. No. 15/483,342 Nonfinal Office Action dated Nov. 2, 2018, 37 pages.
U.S. Appl. No. 15/483,347 Final Office Action dated Apr. 16, 2019, 23 pages.
U.S. Appl. No. 15/483,347 Nonfinal Office Action dated Nov. 2, 2018, 20 pages.
U.S. Appl. No. 15/483,348 Final Office Action dated Apr. 9, 2019, 28 pages.
U.S. Appl. No. 15/483,348 Nonfinal Office Action dated Nov. 21, 2018, 22 pages.
Vaikhanski et al., "Fiber-reinforced composite foam from expandable PVC microspheres" Composites Part A (2003) vol. 34, pp. 1245-1253.
Wikipedia contributors. "Anode." Wikipedia, The Free Encyclopedia, Mar. 4, 2019, Web. Mar. 18, 2019. (Year: 2019).
Wikipedia contributors. "Molar mass distribution." Wikipedia, The Free Encyclopedia, Feb. 1, 2019, Web. Mar. 18, 2019. (Year: 2019).
PCT/US19/21137 International Search Report and Written Opinion dated Jun. 18, 2019, 13 pages.
U.S. Appl. No. 15/901,367 Nonfinal Office Action dated Jun. 10, 2019, 12 pages.
"Nylon" en.wikipedia.org/wiki/Nylon. Accessed Feb. 18, 2020 (Year: 2020).
PCT/US19/27147 International Search Report and Written Opinion dated Aug. 1, 2019, 16 pages.
PCT/US19/36748 International Search Report and Written Opinion dated Oct. 16, 2019, 11 pages.
PCT/US19/37690 International Search Report and Written Opinion dated Oct. 18, 2019, 18 pages.
PCT/US19/37692 International Search Report and Written Opinion dated Oct. 21, 2019, 18 pages.
PCT/US19/37700 International Search Report and Written Opinion dated Oct. 23, 2019, 17 pages.
PCT/US19/38367 International Search Report and Written Opinion dated Oct. 18, 2019, 17 pages.
POT/US19/38368 International Search Report and Written Opinion dated Oct. 18, 2019, 18 pages.
POT/US19/38436 International Search Report and Written Opinion dated Oct. 16, 2019, 17 pages.
POT/US19/38455 International Search Report and Written Opinion dated Oct. 18, 2019, 10 pages.
POT/US19/38456 International Search Report and Written Opinion dated Oct. 16, 2019, 16 pages.
PCT/US19/38881 International Search Report and Written Opinion dated Oct. 18, 2019, 14 pages.
PCT/US19/47642 International Search Report and Written Opinion dated Dec. 6, 2019, 16 pages.
PCT/US19/48084 International Search Report and Written Opinion dated Dec. 16, 2019, 9 pages.
POT/US19/55758 International Search Report and Written Opinion dated Jan. 31, 2020, 15 pages.
U.S. Appl. No. 14/999,080 Nonfinal Office Action dated Oct. 30, 2019, 15 pages.
U.S. Appl. No. 15/434,632 Final Office Action dated Dec. 26, 2019, 20 pages.
U.S. Appl. No. 15/442,278 Final Office Action dated Oct. 21, 2019, 16 pages.
U.S. Appl. No. 15/442,803 Final Office Action dated Feb. 24, 2020, 36 pages.
U.S. Appl. No. 15/442,803 Nonfinal Office Action dated Jul. 25, 2019, 37 pages.

(56) References Cited

OTHER PUBLICATIONS

U.S. Appl. No. 15/478,125 Final Office Action dated Aug. 23, 2019, 14 pages.
U.S. Appl. No. 15/483,347 Final Office Action dated Dec. 27, 2019, 22 pages.
U.S. Appl. No. 15/483,347 Nonfinal Office Action dated Sep. 17, 2019, 20 pages.
U.S. Appl. No. 15/483,348 Advisory Action dated Jul. 18, 2019, 9 pages.
U.S. Appl. No. 15/483,348 Final Office Action dated Jan. 20, 2020, 9 pages.
U.S. Appl. No. 15/483,348 Nonfinal Office Action dated Sep. 16, 2019, 22 pages.
U.S. Appl. No. 15/676,677 Nonfinal Office Action dated Feb. 5, 2020, 15 pages.
U.S. Appl. No. 15/903,808 Nonfinal Office Action dated Jan. 28, 2020, 8 pages.
U.S. Appl. No. 15/910,465 Nonfinal Office Action dated Nov. 1, 2019, 12 pages.
U.S. Appl. No. 15/910,471 Non-final Office Action dated Nov. 8, 2019, 12 pages.
U.S. Appl. No. 15/914,216 Final Office Action dated Dec. 19, 2019, 9 pages.
U.S. Appl. No. 16/010,965 Nonfinal Office Action dated Jan. 8, 2020, 5 pages.
U.S. Appl. No. 16/010,975 Nonfinal Office Action dated Jan. 8, 2020, 5 pages.
U.S. Appl. No. 16/014,623 Nonfinal Office Action dated Oct. 4, 2019, 8 pages.
U.S. Appl. No. 16/017,294 Nonfinal Office Action dated Jan. 23, 2020, 6 pages.
U.S. Appl. No. 16/113,676 Nonfinal Office Action dated Oct. 4, 2019, 9 pages.
U.S. Appl. No. 16/120,875 Nonfinal Office Action dated Oct. 4, 2019, 10 pages.
U.S. Appl. No. 16/123,218 Nonfinal Office Action dated Oct. 4, 2019, 9 pages.
U.S. Appl. No. 16/166,574 Nonfinal Office Action dated Oct. 4, 2019, 9 pages.
AZO Materials Table of Properties on Styrene Butadiene Rubber, 5 pages.
PCT/US20/14869 International Search Report and Written Opinion dated May 19, 2020, 13 pages.
U.S. Appl. No. 15/434,632 Nonfinal Office Action dated Jun. 26, 2020, 19 pages.
U.S. Appl. No. 15/442,278 Nonfinal Office Action dated Feb. 28, 2020, 16 pages.
U.S. Appl. No. 15/442,803 Nonfinal Office Action dated Jul. 20, 2020, 8 pages.
U.S. Appl. No. 15/483,347 Nonfinal Office Action dated Jun. 17, 2020, 14 pages.
U.S. Appl. No. 15/485,934 Nonfinal Office Action dated May 26, 2020, 12 pages.
U.S. Appl. No. 15/676,680 Nonfinal Office Action dated May 20, 2020, 8 pages.
U.S. Appl. No. 15/903,788 Nonfinal Office Action dated Jun. 4, 2020, 11 pages.
U.S. Appl. No. 15/903,808 Final Office Action dated May 15, 2020, 9 pages.
U.S. Appl. No. 15/910,465 Final Office Action dated May 15, 2020, 13 pages.
U.S. Appl. No. 15/910,471 Nonfinal Office Action dated May 13, 2020, 11 pages.
U.S. Appl. No. 15/954,088 Nonfinal Office Action dated Mar. 13, 2020, 9 pages.
U.S. Appl. No. 16/010,213 Nonfinal Office Action dated Mar. 27, 2020, 12 pages.
U.S. Appl. No. 16/010,225 Final Office Action dated Jul. 8, 2020, 7 pages.
U.S. Appl. No. 16/010,225 Nonfinal Office Action dated Mar. 27, 2020, 13 pages.
U.S. Appl. No. 16/014,623 Final Office Action dated Apr. 9, 2020, 14 pages.
U.S. Appl. No. 16/112,208 Nonfinal Office Action dated Apr. 2, 2020, 7 pages.
U.S. Appl. No. 16/112,225 Nonfinal Office Action dated May 13, 2020, 9 pages.
U.S. Appl. No. 16/113,676 Final Office Action dated Apr. 9, 2020, 15 pages.
U.S. Appl. No. 16/114,959 Final Office Action dated Jul. 22, 2020, 6 pages.
U.S. Appl. No. 16/116,329 Final Office Action dated Jul. 23, 2020, 6 pages.
U.S. Appl. No. 16/116,329 Nonfinal Office Action dated Mar. 30, 2020, 6 pages.
U.S. Appl. No. 16/116,341 Final Office Action dated Jul. 23, 2020, 6 pages.
U.S. Appl. No. 16/116,341 Nonfinal Office Action dated Mar. 30, 2020, 6 pages.
U.S. Appl. No. 16/120,875 Final Office Action dated Apr. 9, 2020, 14 pages.
U.S. Appl. No. 16/123,218 Final Office Action dated Apr. 9, 2020, 13 pages.
U.S. Appl. No. 16/126,736 Final Office Action dated Jul. 23, 2020, 6 pages.
U.S. Appl. No. 16/126,736 Nonfinal Office Action dated Mar. 30, 2020, 6 pages.
U.S. Appl. No. 16/126,745 Final Office Action dated Jul. 23, 2020, 6 pages.
U.S. Appl. No. 16/126,745 Nonfinal Office Action dated Mar. 30, 2020, 6 pages.
U.S. Appl. No. 16/160,257 Nonfinal Office Action dated Apr. 3, 2020, 16 pages.
U.S. Appl. No. 16/166,536 Nonfinal Office Action dated May 14, 2020, 5 pages.
U.S. Appl. No. 16/166,574 Final Office Action dated Apr. 9, 2020, 12 pages.
U.S. Appl. No. 16/238,052 Nonfinal Office Action dated Apr. 3, 2020, 14 pages.
U.S. Appl. No. 16/256,321 Nonfinal Office Action dated Jul. 27, 2020, 8 pages.
U.S. Appl. No. 16/256,346 Nonfinal Office Action dated May 19, 2020, 16 pages.
U.S. Appl. No. 15/434,632 Final Office Action dated Jan. 4, 2021, 20 pages.
U.S. Appl. No. 15/903,788 Final Office Action dated Feb. 1, 2021, 9 pages.
U.S. Appl. No. 15/903,808 Nonfinal Office Action dated Mar. 19, 2021, 8 pages.
U.S. Appl. No. 15/914,213 Nonfinal Office Action dated Aug. 31, 2020, 8 pages.
U.S. Appl. No. 15/954,046 Nonfinal Office Action dated Nov. 20, 2020, 10 pages.
U.S. Appl. No. 15/954,088 Final Office Action dated Aug. 7, 2020, 8 pages.
U.S. Appl. No. 16/010,213 Final Office Action dated Jun. 15, 2018, 10 pages.
U.S. Appl. No. 16/010,213 Nonfinal Office Action dated Jan. 6, 2021, 10 pages.
U.S. Appl. No. 16/109,142 Nonfinal Office Action dated Oct. 13, 2020, 9 pages.
U.S. Appl. No. 16/109,178 Nonfinal Office Action dated Feb. 5, 2021, 11 pages.
U.S. Appl. No. 16/112,225 Final Office Action dated Oct. 1, 2020, 12 pages.
U.S. Appl. No. 16/112,225 Nonfinal Office Action dated Mar. 18, 2021, 10 pages.
U.S. Appl. No. 16/113,676 Nonfinal Office Action dated Dec. 24, 2020, 12 pages.
U.S. Appl. No. 16/120,875 Nonfinal Office Action dated Dec. 30, 2020, 14 pages.

(56) References Cited

OTHER PUBLICATIONS

U.S. Appl. No. 16/123,218 Nonfinal Office Action dated Dec. 30, 2020, 11 pages.
U.S. Appl. No. 16/160,257 Final Office Action dated Oct. 14, 2020, 15 pages.
U.S. Appl. No. 16/160,257 Nonfinal Office Action dated Mar. 26, 2021, 31 pages.
U.S. Appl. No. 16/166,536 Final Office Action dated Nov. 18, 2020, 7 pages.
U.S. Appl. No. 16/166,574 Nonfinal Office Action dated Dec. 30, 2020, 9 pages.
U.S. Appl. No. 16/238,052 Final Office Action dated Oct. 14, 2020, 15 pages.
U.S. Appl. No. 16/238,052 Nonfinal Office Action dated Mar. 26, 2021, 16 pages.
U.S. Appl. No. 16/238,061 Nonfinal Office Action dated Aug. 14, 2020, 8 pages.
U.S. Appl. No. 16/256,321 Final Office Action dated Nov. 3, 2020, 8 pages.
U.S. Appl. No. 16/256,346 Final Office Action dated Dec. 8, 2020, 18 pages.
U.S. Appl. No. 16/014,623 Nonfinal Office Action dated Dec. 24, 2020, 11 pages.
CN 2018800380346; Chinese Office Action dated Oct. 29, 2021; 21 pages.
Feng et al., Silicon-based anodes for lithium-ion batteries: from fundamentals to practical applications, Small, 14 (2018), p. 1702737 (Year 2018).
JP 2019-544068; Japanese Office Action dated Nov. 30, 2021; 3 pages.
JP 2019-546030; Japanese Office Action dated Jan. 4, 2022; 5 pages.
JP 2019555198; Japanese Office Action dated Nov. 9, 2021; 5 pages.
U.S. Appl. No. 16/113,676 Advisory Action dated Sep. 14, 2021, 8 pages.
U.S. Appl. No. 16/123,218; Office Action dated Dec. 9, 2021; 48 pages.
U.S. Appl. No. 16/160,257 Final Office Action dated Jul. 26, 2021, 37 pages.
U.S. Appl. No. 16/238,052 Final Office Action dated Jul. 20, 2021; 34 pages.
U.S. Appl. No. 16/256,346 Non-Final Office Action dated Oct. 27, 2021; 48 pages.
Chinese Patent Application No. 2018800386573; Chinese Office Action dated Aug. 18, 2022; 11 pages.
CN 2018800177281; Chinese Office Action dated Jan. 30, 2022; 10 pages.
CN 2018800256014; Chinese Office Action dated Mar. 25, 2022; 14 pages.
CN 2018800265070; Chinese Office Action dated May 11, 2022; 18 pages.
CN 2018800273645; Chinese Office Action dated Jan. 26, 2022; 19 pages.
CN 201880034730X; Chinese Office Action dated Feb. 7, 2022; 13 pages.
CN 2018800350285; Chinese Office Action dated May 16, 2022; 18 Pages.
CN 2018800383113; Chinese Office Action dated Feb. 10, 2022; 12 pages.
CN Application No. 2018800380346; Chinese Office Action dated Jun. 30, 2022; 17 pages.
International No. PCT/US2021/072106; International Search Report; 4 pages.
JP 2010040218A; Japanese Office Action dated Feb. 7, 2022; 11 pages.
JP 2018800265117; Japanese Office Action dated Feb. 7, 2022; 12 pages.
JP 2019-546169; Japanese Office Action dated Jan. 4, 2022; 4 Pages.
JP 2019555155; Japanese Office Action dated Feb. 22, 2022; 3 pages.
JP 2019555187; Japanese Office Action dated Mar. 1, 2022; 5 pages.
Li, Lin Yan, et al.; "PEO-coated sulfur-carbon composite for high-performance lithium-sulfur batteries," J Solid State Electrochem, 2015, vol. 19, pp. 3373-3379.
Liu, Yayuan, et al.; "An Artificial Solid Electrolyte Interphase with High Li-Ion Conductivity, Mechanical Strength, and Flexibility for Stable Lithium Metal Anodes," Advanced Materials, 2017, vol. 29, pp. 1-8.
PCT/US21/72916; International Search Report dated Mar. 29, 2022; 5 pages.
U.S. Appl. No. 15/434,632; Non-Final Office Action dated Mar. 14, 2022; 34 pages.
U.S. Appl. No. 15/903,788; Final Office Action dated Feb. 3, 2022; 16 pages.
U.S. Appl. No. 16/238,052; Final Office Action dated Apr. 4, 2022; 28 pages.
U.S. Appl. No. 16/160,257; Non-Final Office Action dated Oct. 24, 2022; 24 pages.
U.S. Appl. No. 15/903,808; Final Office Action dated Jan. 10, 2023; 74 pages.
U.S. Appl. No. 16/014,623; Final Office Action dated Jun. 2, 2022; 63 pages.
U.S. Appl. No. 16/014,623; Non-Final Office Action dated Nov. 25, 2022; 123 pages.
U.S. Appl. No. 17/110,874; Non-Final Office Action dated Aug. 4, 2022; 87 pages.
U.S. Appl. No. 17/121,456; Non-Final Office Action dated Nov. 10, 2022; 50 pages.

* cited by examiner

ENCAPSULATED ANODE ACTIVE MATERIAL PARTICLES, LITHIUM SECONDARY BATTERIES CONTAINING SAME, AND METHOD OF MANUFACTURING

FIELD OF THE INVENTION

The present invention relates generally to the field of rechargeable lithium battery and, more particularly, to the anode active materials in the form of high-elasticity polymer-encapsulated particles and the process for producing same.

BACKGROUND OF THE INVENTION

A unit cell or building block of a lithium-ion battery is typically composed of an anode current collector, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the binder layer is used to bond the anode active material (e.g. graphite or Si particles) and a conductive filler (e.g. carbon black or carbon nanotube) together to form an anode layer of structural integrity, and to bond the anode layer to a separate anode current collector, which acts to collect electrons from the anode active material when the battery is discharged. In other words, in the negative electrode (anode) side of the battery, there are typically four different materials involved: an anode active material, a conductive additive, a resin binder (e.g. polyvinylidine fluoride, PVDF, or styrene-butadiene rubber, SBR), and an anode current collector (typically a sheet of Cu foil). Typically the former three materials form a separate, discrete anode layer and the latter one forms another discrete layer.

The most commonly used anode active materials for lithium-ion batteries are natural graphite and synthetic graphite (or artificial graphite) that can be intercalated with lithium and the resulting graphite intercalation compound (GIC) may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective solid-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the charge transfer purpose. As the SEI is formed, the lithium ions become part of the inert SEI layer and become irreversible, i.e. these positive ions can no longer be shuttled back and forth between the anode and the cathode during charges/discharges. Therefore, it is desirable to use a minimum amount of lithium for the formation of an effective SEI layer. In addition to SEI formation, the irreversible capacity loss $Q_{ir}$ can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal or semiconductor element, such as Al and Si, and "a" satisfies 0<a≤5) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

To overcome the problems associated with such mechanical degradation, three technical approaches have been proposed:
(1) reducing the size of the active material particle, presumably for the purpose of reducing the total strain energy that can be stored in a particle, which is a driving force for crack formation in the particle. However, a reduced particle size implies a higher surface area available for potentially reacting with the liquid electrolyte to form a higher amount of SEI. Such a reaction is undesirable since it is a source of irreversible capacity loss.
(2) depositing the electrode active material in a thin film form directly onto a current collector, such as a copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area (even though the capacity per unit mass can be large). Such a thin film must have a thickness less than 100 nm to be more resistant to cycling-induced cracking, further diminishing the total lithium storage capacity and the lithium storage capacity per unit electrode surface area. Such a thin-film battery has very limited scope of application. A desirable and typical electrode thickness is from 100 μm to 200 μm. These thin-film electrodes (with a thickness of <500 nm or even <100 nm) fall short of the required thickness by three (3) orders of magnitude, not just by a factor of 3.
(3) using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nano particles. Presumably, the protective matrix provides a cushioning effect for particle expansion or shrinkage, and prevents the electrolyte from contacting and reacting with the electrode active material. Examples of high-capacity anode active particles are Si, Sn, and $SnO_2$. Unfortunately, when an active material particle, such as Si particle, expands (e.g. up to a volume expansion of 380%) during the battery charge step, the protective coating is easily broken due to the mechanical weakness and/o brittleness of the protective coating materials. There has been no high-strength and high-toughness material available that is itself also lithium ion conductive.

It may be further noted that the coating or matrix materials used to protect active particles (such as Si and Sn) are carbon, sol gel graphite, metal oxide, monomer, ceramic, and lithium oxide. These protective materials are all very brittle, weak (of low strength), and/or non-conducting (e.g., ceramic or oxide coating). Ideally, the protective material should meet the following requirements: (a) The coating or matrix material should be of high strength and stiffness so that it can help to refrain the electrode active material particles, when lithiated, from expanding to an excessive extent. (b) The protective material should also have high fracture toughness or high resistance to crack formation to avoid disintegration during repeated cycling. (c) The protective material must be inert (inactive) with respect to the electrolyte, but be a good lithium ion conductor. (d) The protective material must not provide any significant amount of defect sites that irreversibly trap lithium ions. (e) The protective material must be lithium ion-conducting as well as electron-conducting. The prior art protective materials all fall short of these requirements. Hence, it was not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles. Additionally, most of these electrodes are not high-rate capable, exhibiting unacceptably low capacity at a high discharge rate.

Due to these and other reasons, most of prior art composite electrodes and electrode active materials have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

Complex composite particles of particular interest are a mixture of separate Si and graphite particles dispersed in a carbon matrix; e.g. those prepared by Mao, et al. ["Carbon-coated Silicon Particle Powder as the Anode Material for Lithium Batteries and the Method of Making the Same," US 2005/0136330 (Jun. 23, 2005)]. Also of interest are carbon matrix-containing complex nano Si (protected by oxide) and graphite particles dispersed therein, and carbon-coated Si particles distributed on a surface of graphite particles Again, these complex composite particles led to a low specific capacity or for up to a small number of cycles only. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pre-graphitic carbon may have too many lithium-trapping sites that irreversibly capture lithium during the first few cycles, resulting in excessive irreversibility.

In summary, the prior art has not demonstrated a composite material that has all or most of the properties desired for use as an anode active material in a lithium-ion battery. Thus, there is an urgent and continuing need for a new anode active material that enables a lithium-ion battery to exhibit a high cycle life, high reversible capacity, low irreversible capacity, small particle sizes (for high-rate capacity), and compatibility with commonly used electrolytes. There is also a need for a method of readily or easily producing such a material in large quantities.

Thus, it is an object of the present invention to meet these needs and address the issues associated the rapid capacity decay of a lithium battery containing a high-capacity anode active material.

SUMMARY OF THE INVENTION

Herein reported is a very unique class of anode active materials: high-elasticity polymer-encapsulated or -embraced particles of an anode active material that is capable of overcoming the rapid capacity decay problem commonly associated with a lithium-ion battery that features a high-capacity anode active material, such as Si, Sn, and $SnO_2$. This high-elasticity polymer is based on an ultra-high molecular thermoplastic polymer or its complex with a lithium-ion salt and/or solvent.

As an embodiment, the particulate of an anode active material for a lithium battery comprises one or a plurality of anode active material particles being embraced or encapsulated by a thin layer of a high-elasticity polymer having a recoverable tensile strain no less than 5% when measured without an additive or reinforcement, a lithium ion conductivity no less than $10^{-6}$ S/cm at room temperature, and a thickness from 0.5 nm to 10 μm, wherein the polymer contains an ultrahigh molecular weight polymer having a molecular weight greater than $0.5 \times 10^6$ grams/mole (up to $9 \times 10^6$ grams/mole). The ultrahigh molecular weight (UHMW) polymer is preferably selected from polyacrylonitrile (PAN), polyethylene oxide (PEO), polypropylene oxide (PPO), polyethylene glycol (PEG), polyvinyl alcohol (PVA), polyacrylamide (PAA), poly(methyl methacrylate) (PMMA), poly(methyl ether acrylate) (PMEA), a copolymer thereof, a sulfonated derivative thereof, a chemical derivative thereof, or a combination thereof.

The UHMW polymer preferably has a recoverable tensile strain no less than 5% (typically 10-200%, more typically 30-100%) when measured without an additive or reinforcement in the polymer under uniaxial tension Preferably, the lithium ion conductivity is no less than $10^{-5}$ S/cm at room temperature (preferably and more typically no less than $10^{-4}$ S/cm and more preferably and typically no less than $10^{-3}$ S/cm). The layer of UHMW polymer preferably has a thickness from 0.5 nm to 10 μm. This embracing polymer layer preferably has a thickness <1 μm, more preferably <100 nm, further more preferably <10 nm, and most preferably from 0.5 nm to 5 nm). The anode active material preferably has a specific capacity of lithium storage greater than 372 mAh/g, which is the theoretical capacity of graphite.

High-elasticity polymer refers to a polymer which exhibits an elastic deformation that is at least 5% when measured (without an additive or reinforcement in the polymer) under uniaxial tension. In the field of materials science and engineering, the "elastic deformation" is defined as a deformation of a material (when being mechanically stressed) that is essentially fully recoverable upon release of the load and the recovery is essentially instantaneous. Conventionally, such a high elasticity comes from a lightly cross-linked polymer or rubber. In contrast, the instant high-elasticity polymer comes from a thermoplastic polymer (a non-cross-linked polymer or a polymer containing no cross-linked network). This thermoplastic is not a cross-linked polymer and is not part of a semi-interpenetrating network (semi-IPN). The elastic deformation of instant UHMW polymer is typically and preferably greater than 10%, more preferably greater than 30%, further more preferably greater than 50%, still more preferably greater than 100%.

The UHMW polymer preferably has a molecular weight from $0.5 \times 10^6$ to less than $5 \times 10^6$ grams/mole, more preferably from $1 \times 10^6$ to less than $3 \times 10^6$ grams/mole. The UHMW polymer can have a molecular weight higher than $5 \times 10^6$ g/mole, or even up to $9 \times 10^6$ g/mole.

In certain embodiments, the ultrahigh molecular weight polymer contains an electrically conductive material dispersed therein. The electrically conducting material may be selected from an electron-conducting polymer, a metal particle or wire, a graphene sheet, a carbon fiber, a graphite fiber, a carbon nano-fiber, a graphite nano-fiber, a carbon nanotube, a graphite particle, an expanded graphite flake, an acetylene black particle, or a combination thereof. The electrically conducting material (e.g. metal nano-wire, nano-fiber, etc.) preferably has a thickness or diameter less than 100 nm.

In certain embodiments, the ultrahigh molecular weight polymer contains a lithium salt and/or a liquid solvent dispersed between chains of the ultrahigh molecular weight polymer.

In the particulate, the liquid solvent may be preferably selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), propylene carbonate (PC), dimethyl carbonate (DMC), methylethyl carbonate (MEC), diethyl carbonate (DEC), ethyl propionate, methyl propionate, gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, an ionic liquid solvent, or a combination thereof The lithium salt may be preferably selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid-based lithium salt, or a combination thereof.

The anode active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) prelithiated versions thereof; (g) particles of Li, Li alloy, or surface-stabilized Li having at least 60% by weight of lithium element therein; and (h) combinations thereof.

In some preferred embodiments, the anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, or a combination thereof, wherein x=1 to 2. It may be noted that pre-lithiation of an anode active material means that this material has been pre-intercalated by or doped with lithium ions up to a weight fraction from 0.1% to 54.7% of Li in the lithiated product.

The anode active material is preferably in a form of nano particle (spherical, ellipsoidal, and irregular shape), nano wire, nano fiber, nano tube, nano sheet, nano belt, nano ribbon, nano disc, nano platelet, or nano horn having a thickness or diameter less than 100 nm. These shapes can be collectively referred to as "particles" unless otherwise specified or unless a specific type among the above species is desired. Further preferably, the anode active material has a dimension less than 50 nm, even more preferably less than 20 nm, and most preferably less than 10 nm.

In some embodiments, one particle or a cluster of particles may be coated with or embraced by a layer of carbon disposed between the particle(s) and the high-elasticity polymer layer (the encapsulating shell). Alternatively or additionally, a carbon layer may be deposited to embrace the encapsulated particle or the encapsulated cluster of multiple anode active material particles.

The particulate may further contain a graphite, graphene, or carbon material mixed with the active material particles and disposed inside the encapsulating or embracing polymer shell. The carbon or graphite material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof. Graphene may be selected from pristine graphene, graphene oxide, reduced graphene oxide, graphene fluoride, hydrogenated graphene, nitrogenated graphene, functionalized graphene, etc.

The anode active material particles may be coated with or embraced by a conductive protective coating, selected from a carbon material, graphene, electronically conductive polymer, conductive metal oxide, or conductive metal coating. Preferably, the anode active material, in the form of a nano particle, nano wire, nano fiber, nano tube, nano sheet, nano belt, nano ribbon, nano disc, nano platelet, or nano horn is pre-intercalated or pre-doped with lithium ions to form a prelithiated anode active material having an amount of lithium from 0.1% to 54.7% by weight of said prelithiated anode active material.

Preferably and typically, the high-elasticity polymer has a lithium ion conductivity no less than $10^{-5}$ S/cm, more preferably no less than $10^{-3}$ S/cm, and most preferably no less than $10^{-2}$ S/cm. Some of the selected polymers exhibit a lithium-ion conductivity greater than $10^{-2}$ S/cm. In some embodiments, the high-elasticity polymer is a neat UHMW polymer containing no additive or filler dispersed therein. In others, the high-elasticity polymer is polymer matrix composite containing from 0.1% to 50% by weight (preferably from 1% to 35% by weight) of a lithium ion-conducting additive dispersed in an UHMW polymer matrix material. In some embodiments, the high-elasticity polymer contains from 0.1% by weight to 10% by weight of a reinforcement nano filament selected from carbon nanotube, carbon nanofiber, graphene, or a combination thereof.

In some embodiments, the UHMW polymer is mixed with an elastomer selected from natural polyisoprene (e.g. cis-1, 4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

In some embodiments, the high-elasticity polymer is a polymer matrix composite containing a lithium ion-conducting additive dispersed in an UHMW polymer matrix material, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4.

The UHMW polymer may form a mixture or blend with an electron-conducting polymer selected from polyaniline, polypyrrole, polythiophene, polyfuran, a bi-cyclic polymer, derivatives thereof (e.g. sulfonated versions), or a combination thereof.

In some embodiments, the UHMW polymer may form a mixture or blend with a lithium ion-conducting polymer selected from lower molecular weight (non-UHMW) poly (ethylene oxide) (PEO), Polypropylene oxide (PPO), poly (acrylonitrile) (PAN), poly(methyl methacrylate) (PMMA), poly(vinylidene fluoride) (PVdF), Poly bis-methoxy ethoxy-ethoxide-phosphazenex, Polyvinyl chloride, Polydimethylsiloxane, poly(vinylidene fluoride)-hexafluoropropylene (PVDF-HFP), a sulfonated derivative thereof, or a combination thereof. Sulfonation is herein found to impart improved lithium ion conductivity to a polymer.

The present invention also provides an anode electrode that contains the presently invented high-elasticity polymer-encapsulated anode material particles, an optional conductive additive (e.g. expanded graphite flakes, carbon black, acetylene black, or carbon nanotube), an optional resin binder (typically required), and, optionally, some amount of the common anode active materials (e.g. particles of natural graphite, synthetic graphite, hard carbon, etc.).

The present invention also provides a lithium battery containing an optional anode current collector, the presently invented anode active material layer as described above, a cathode active material layer, an optional cathode current collector, an electrolyte in ionic contact with the anode active material layer and the cathode active material layer and an optional porous separator. The lithium battery may be a lithium-ion battery, lithium metal battery (containing lithium metal or lithium alloy as the main anode active material and containing no intercalation-based anode active material), lithium-sulfur battery, lithium-selenium battery, or lithium-air battery.

The present invention also provides a method of manufacturing a lithium battery. The method comprises: (a) providing a cathode and an optional cathode current collector to support the cathode; (b) providing an anode and an optional anode current collector to support the anode; and (c) providing an electrolyte in contact with the anode and the cathode and an optional separator electrically separating the anode and the cathode; wherein providing the anode includes providing multiple particulates of an anode active material, wherein a particulate is composed of one or a plurality of anode active material particles being embraced or encapsulated by a thin layer of a high-elasticity polymer (containing an ultrahigh molecular weight polymer) having a fully recoverable tensile strain (elastic strain) no less than 5% (typically from 5% to 200%) when measured without an additive or reinforcement, a lithium ion conductivity no less than $10^{-6}$ S/cm at room temperature, and a thickness from 0.5 nm to 10 μm.

Preferably, high-elasticity polymer has a thickness from 1 nm to 100 nm. Preferably, the high-elasticity polymer has a lithium ion conductivity from $1\times10^{-5}$ S/cm to $2\times10^{-2}$ S/cm.

The ultrahigh molecular weight (UHMW) polymer is preferably selected from polyacrylonitrile, polyethylene oxide, polypropylene oxide, polyethylene glycol, polyvinyl alcohol, polyacrylamide, poly(methyl methacrylate), poly (methyl ether acrylate), a copolymer thereof, a sulfonated derivative thereof, a chemical derivative thereof, or a combination thereof.

The step of providing multiple particulates can include encapsulating or embracing the one or a plurality of anode active material particles with a thin layer of high-elasticity polymer using a procedure selected from pan coating, air suspension, centrifugal extrusion, vibrational nozzle, spray-drying, ultrasonic spraying, coacervation-phase separation, interfacial polycondensation, in-situ polymerization, matrix polymerization, or a combination thereof.

In certain embodiments, the step of providing multiple particulates includes encapsulating or embracing said one or a plurality of anode active material particles with a mixture of an UHMW polymer with an elastomer, an electronically conductive polymer (e.g. polyaniline, polypyrrole, polythiophene, polyfuran, a bi-cyclic polymer, a sulfonated derivative thereof, or a combination thereof), a lithium-ion conducting material, a reinforcement material (e.g. carbon nanotube, carbon nano-fiber, and/or graphene), or a combination thereof.

The lithium ion-conducting material is dispersed in the high-elasticity polymer and is preferably selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4.

In some embodiments, the lithium ion-conducting material is dispersed in the high-elasticity polymer and is selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, LiN $(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl- Phosphates, $LiPF_3(CF_2CF_3)_3$, lithium bisperfluoroethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

In the invented method, the anode active material is selected from the group consisting of: (a) silicon (Si), germanium (Ge), tin (Sn), zinc (Zn), aluminum (Al), titanium (Ti), nickel (Ni), cobalt (Co), and cadmium (Cd); (b) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (c) lithium titanate, lithium manganate, lithium aluminate, lithium-containing titanium oxide, lithium transition metal oxide, $ZnCo_2O_4$; (d) prelithiated versions thereof; (e) mixtures thereof with a carbon, graphene, or graphite material; (f) particles of Li, Li alloy, or surface-stabilized Li having at least 60% by weight of lithium element therein; and (f) combinations thereof.

Preferably, one or a plurality of anode active material particles is coated with a layer of carbon or graphene disposed between the one or the plurality of particles and the high-elasticity polymer layer. Preferably, one or a plurality of anode active material particles is mixed with a carbon or graphite material to form a mixture and the mixture is embraced by one or a plurality of graphene sheets disposed between the mixture and the high-elasticity polymer layer. Preferably, the anode active material particles, possibly along with a carbon or graphite material and/or with some internal graphene sheets, are embraced by graphene sheets to form anode active material particulates, which are then embraced or encapsulated by the high-elasticity polymer. The graphene sheets may be selected from pristine graphene (e.g. that prepared by CVD or liquid phase exfoliation using direct ultrasonication), graphene oxide, reduced graphene oxide (RGO), graphene fluoride, doped graphene, functionalized graphene, etc.

DESCRIPTION OF THE PREFERRED EMBODIMENTS

This invention is directed at an anode active material and an anode layer (negative electrode layer, not including the anode current collector) containing such an anode active material for a lithium secondary battery. The battery is preferably a secondary battery based on a non-aqueous electrolyte, a polymer gel electrolyte, an ionic liquid electrolyte, a quasi-solid electrolyte, or a solid-state electrolyte. The shape of a lithium secondary battery can be cylindrical, square, button-like, etc. The present invention is not limited to any battery shape or configuration or any type of electrolyte. For convenience, we will primarily use Si, Sn, and $SnO_2$ as illustrative examples of a high-capacity anode active material. This should not be construed as limiting the scope of the invention.

Figure 1A:
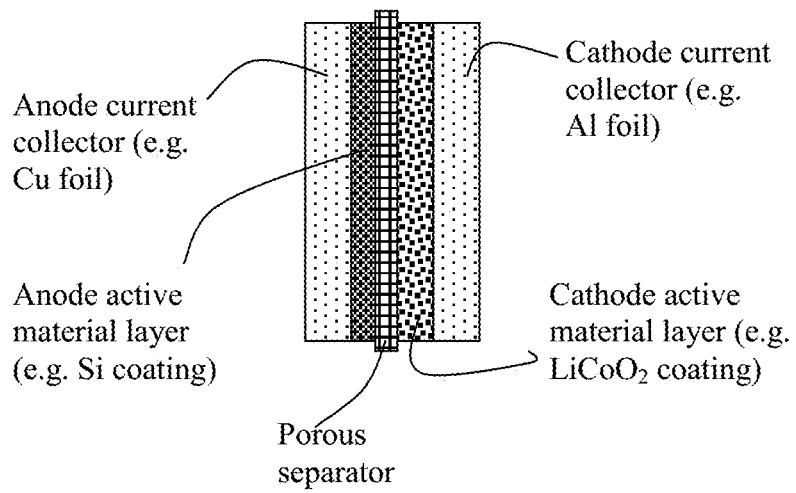
FIG. 1(A) Schematic of a prior art lithium-ion battery cell, wherein the anode layer is a thin coating of an anode active material itself.
Figure 1B:
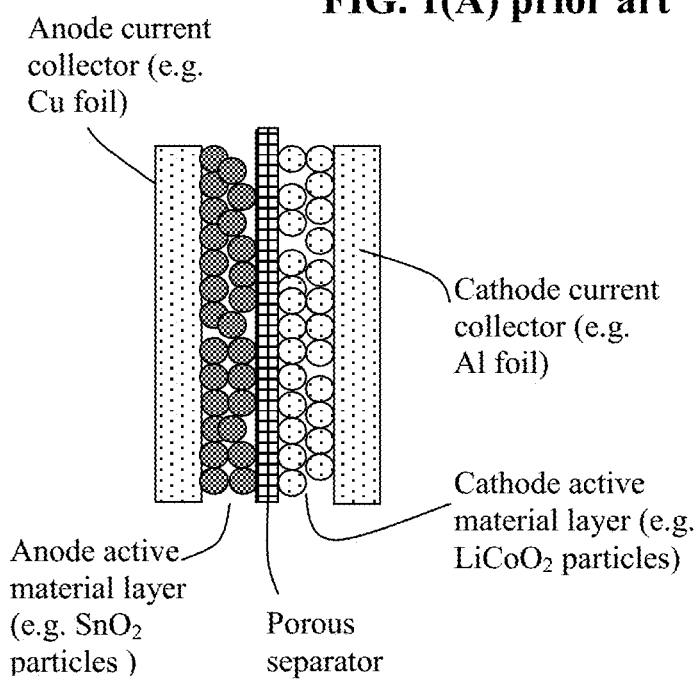
FIG. 1(B) Schematic of another prior art lithium-ion battery; the anode layer being composed of particles of an anode active material, a conductive additive (not shown) and a resin binder (not shown).

As illustrated in FIG. 1(B), a lithium-ion battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the anode layer is composed of particles of an anode active material (e.g. graphite, Sn, $SnO_2$, or Si), a conductive additive (e.g. carbon black particles), and a resin binder (e.g. SBR or PVDF). This anode layer is typically 50-300 µm thick (more typically 100-200 µm) to give rise to a sufficient amount of current per unit electrode area.

In a less commonly used cell configuration, as illustrated in FIG. 1(A), the anode active material is deposited in a thin film form directly onto an anode current collector, such as a layer of Si coating deposited on a sheet of copper foil. This is not commonly used in the battery industry and, hence, will not be discussed further.

Figure 2A:
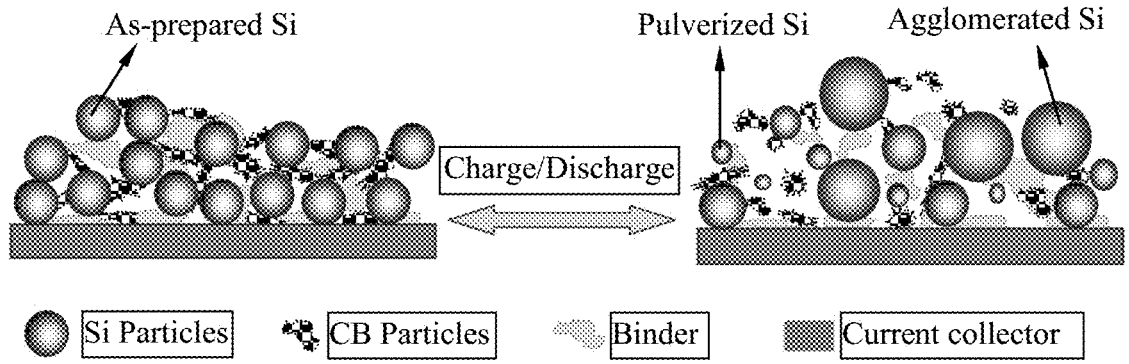
FIG. 2(A) Schematic illustrating the notion that expansion of Si particles, upon lithium intercalation during charging of a prior art lithium-ion battery, can lead to pulverization of Si particles, interruption of the conductive paths formed by the conductive additive, and loss of contact with the current collector.

In order to obtain a higher energy density cell, the anode in FIG. 1(B) can be designed to contain higher-capacity anode active materials having a composition formula of Li$_a$A (A is a metal or semiconductor element, such as Al and Si, and "a" satisfies 0<a≤5). These materials are of great interest due to their high theoretical capacity, e.g., Li$_4$Si (3,829 mAh/g), Li$_{4.4}$Si (4,200 mAh/g), Li$_{4.4}$Ge (1,623 mAh/g), Li$_{4.4}$Sn (993 mAh/g), Li$_3$Cd (715 mAh/g), Li$_3$Sb (660 mAh/g), Li$_{4.4}$Pb (569 mAh/g), LiZn (410 mAh/g), and Li$_3$Bi (385 mAh/g). However, as discussed in the Background section, there are several problems associated with the implementation of these high-capacity anode active materials:

1) As schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

2) The approach of using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nano particles, has failed to overcome the capacity decay problem. Presumably, the protective matrix provides a cushioning effect for particle expansion or shrinkage, and prevents the electrolyte from contacting and reacting with the electrode active material. Unfortunately, when an active material particle, such as Si particle, expands (e.g. up to a volume expansion of 380%) during the battery charge step, the protective coating is easily broken due to the mechanical weakness and/o brittleness of the protective coating materials. There has been no high-strength and high-toughness material available that is itself also lithium ion conductive.

3) The approach of using a core-shell structure (e.g. Si nano particle encapsulated in a carbon or SiO$_2$ shell) also has not solved the capacity decay issue. As illustrated in upper portion of FIG. 2(B), a non-lithiated Si particle can be encapsulated by a carbon shell to form a core-shell structure (Si core and carbon or SiO$_2$ shell in this example). As the lithium-ion battery is charged, the anode active material (carbon- or SiO$_2$-encapsulated Si particle) is intercalated with lithium ions and, hence, the Si particle expands. Due to the brittleness of the encapsulating shell (carbon), the shell is broken into segments, exposing the underlying Si to electrolyte and subjecting the Si to undesirable reactions with electrolyte during repeated charges/discharges of the battery. These reactions continue to consume the electrolyte and reduce the cell's ability to store lithium ions.

Figure 2B:
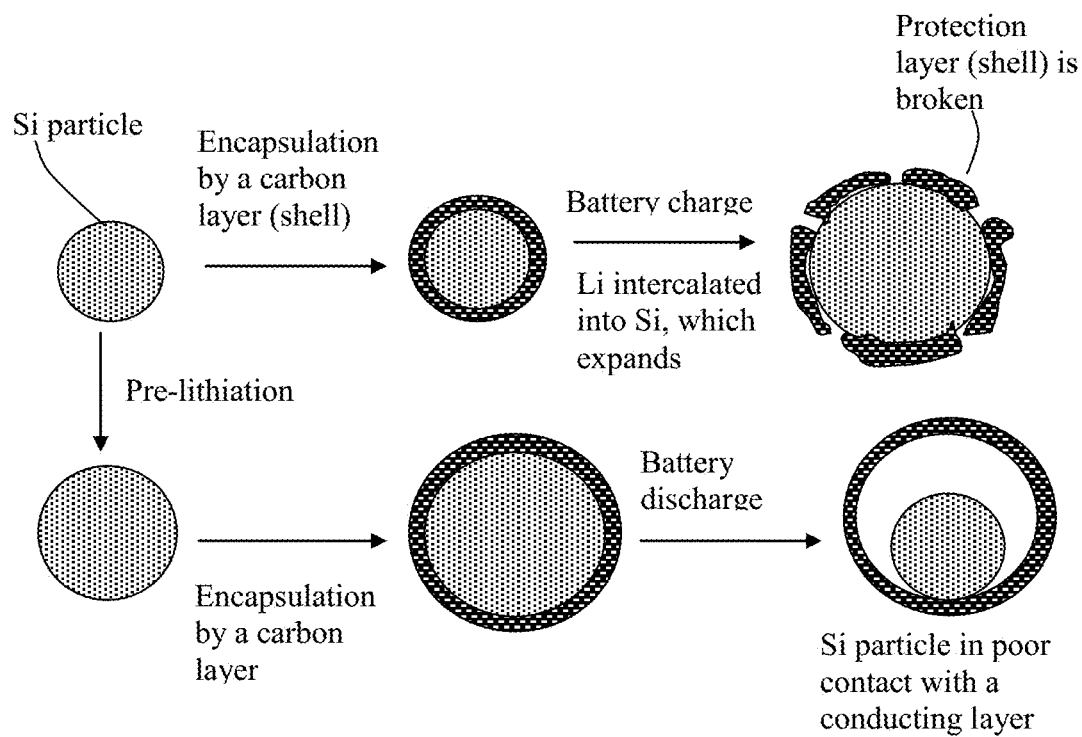
FIG. 2(B) illustrates the issues associated with prior art anode active material; for instance, a non-lithiated Si particle encapsulated by a protective shell (e.g. carbon shell) in a core-shell structure inevitably leads to breakage of the shell and that a pre-lithiated Si particle encapsulated with a protective layer leads to poor contact between the contracted Si particle and the rigid protective shell during battery discharge.

4) Referring to the lower portion of FIG. 2(B), wherein the Si particle has been pre-lithiated with lithium ions; i.e. has been pre-expanded in volume. When a layer of carbon (as an example of a protective material) is encapsulated around the pre-lithiated Si particle, another core-shell structure is formed. However, when the battery is discharged and lithium ions are released (de-intercalated) from the Si particle, the Si particle contracts, leaving behind a large gap between the protective shell and the Si particle. Such a configuration is not conducive to lithium intercalation of the Si particle during the subsequent battery charge cycle due to the gap and the poor contact of Si particle with the protective shell (through which lithium ions can diffuse). This would significantly curtail the lithium storage capacity of the Si particle particularly under high charge rate conditions.

In other words, there are several conflicting factors that must be considered concurrently when it comes to the design and selection of an anode active material in terms of material type, shape, size, porosity, and electrode layer thickness. Thus far, there has been no effective solution offered by any prior art teaching to these often conflicting problems. We have solved these challenging issues that have troubled battery designers and electrochemists alike for more than 30 years by developing the elastomer-protected anode active material.

The present invention provides an anode active material layer that comprises multiple particulates of an anode active material, wherein the particulate is composed of one or a plurality of anode active material particles being embraced or encapsulated by a thin layer of a high-elasticity polymer (containing an ultra-high molecular weight polymer having a molecular weight no less than 500,000 g/mole or 0.5×10$^6$ g/mole) having a recoverable tensile strain no less than 5% when measured without an additive or reinforcement in the polymer under uniaxial tension, a lithium ion conductivity no less than 10$^{-6}$ S/cm at room temperature (preferably and more typically no less than 10$^{-4}$ S/cm and more preferably and typically no less than 10$^{-3}$ S/cm), and a thickness from 0.5 nm (representing a molecular monolayer) to 10 µm. This embracing high-capacity polymer layer preferably has a thickness <1 µm, more preferably <100 nm, further more preferably <10 nm, and most preferably from 0.5 nm to 5 nm). The anode active material preferably has a specific capacity of lithium storage greater than 372 mAh/g, which is the theoretical capacity of graphite.

High-elasticity polymer refers to a polymer which exhibits an elastic deformation that is at least 5% when measured (without an additive or reinforcement in the polymer) under uniaxial tension. In the field of materials science and engineering, the "elastic deformation" is defined as a deformation of a material (when being mechanically stressed) that is essentially fully recoverable and the recovery is essentially instantaneous upon release of the load. The elastic deformation is preferably greater than 10%, more preferably greater than 30%, further more preferably greater than 50%, still more preferably greater than 50%, and most preferably greater than 100%. The preferred types of high-capacity polymers will be discussed later.

Figure 4:
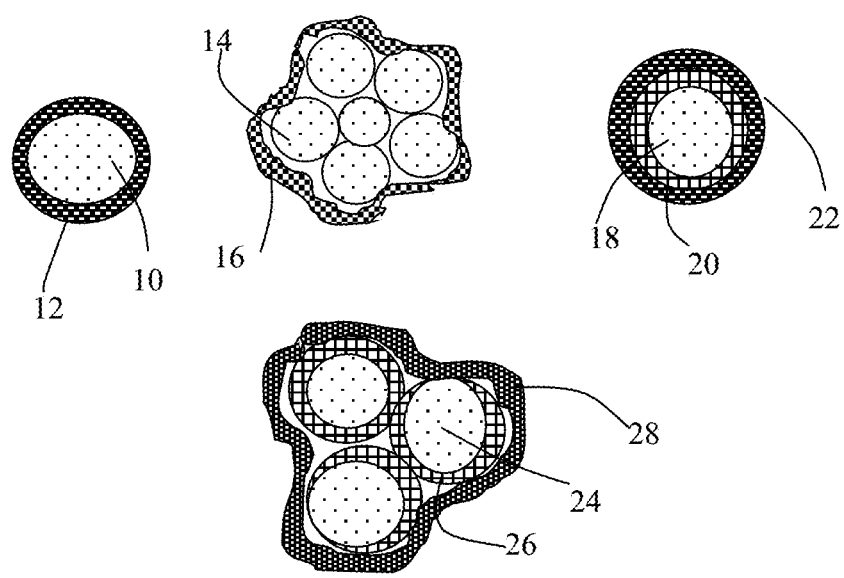
FIG. 4 Schematic of four types of UHMW polymer-embraced anode active material particles.

As illustrated in FIG. 4, the present invention provides four major types of particulates of high-elasticity polymer-encapsulated anode active material particles. The first one is a single-particle particulate containing an anode active material core 10 encapsulated by a high-elasticity polymer shell 12. The second is a multiple-particle particulate containing multiple anode active material particles 14 (e.g. Si nano particles), optionally along with other active materials (e.g. particles of graphite or hard carbon, not shown) or conductive additive, which are encapsulated by a high-elasticity polymer 16. The third is a single-particle particulate containing an anode active material core 18 coated by a carbon or graphene layer 20 (or other conductive material) further encapsulated by a high-elasticity polymer 22. The fourth is a multiple-particle particulate containing multiple anode active material particles 24 (e.g. Si nano particles) coated with a conductive protection layer 26 (carbon, graphene, etc.), optionally along with other active materials (e.g. particles of graphite or hard carbon, not shown) or conductive additive, which are encapsulated by a high-elasticity polymer shell 28. These anode active material particles can be pre-lithiated or non-prelithiated.

Figure 3:
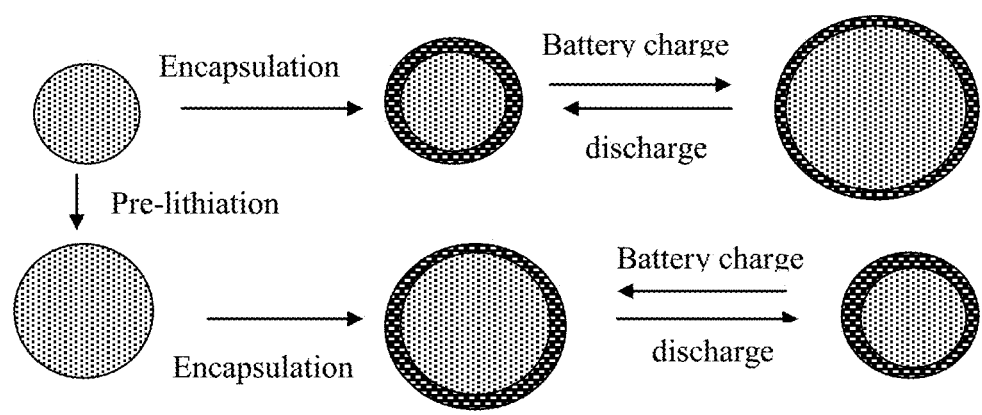
FIG. 3 Schematic of the presently invented high-elasticity polymer-encapsulated anode active material particles (pre-lithiated or unlithiated). The high elastic deformation of the polymer shell enables the shell to expand and contract congruently and conformingly with the core particle.

As schematically illustrated in the upper portion of FIG. 3, a non-lithiated Si particle can be encapsulated by a high-elasticity polymer shell to form a core-shell structure (Si core and UHMW polymer shell in this example). As the lithium-ion battery is charged, the anode active material (high-elasticity polymer-encapsulated Si particle) is intercalated with lithium ions and, hence, the Si particle expands. Due to the high elasticity of the encapsulating shell (the UHMW polymer), the shell will not be broken into segments (in contrast to the broken carbon shell). That the high-elasticity polymer shell remains intact prevents the exposure of the underlying Si to electrolyte and, thus, prevents the Si from undergoing undesirable reactions with electrolyte during repeated charges/discharges of the battery. This strategy prevents continued consumption of the electrolyte to form additional SEI.

Alternatively, referring to the lower portion of FIG. 3, wherein the Si particle has been pre-lithiated with lithium ions; i.e. has been pre-expanded in volume. When a layer of high-elasticity polymer is encapsulated around the pre-lithiated Si particle, another core-shell structure is formed. When the battery is discharged and lithium ions are released (de-intercalated) from the Si particle, the Si particle contracts. However, the high-elasticity polymer is capable of elastically shrinking in a conformal manner; hence, leaving behind no gap between the protective shell and the Si particle. Such a configuration is amenable to subsequent lithium intercalation and de-intercalation of the Si particle. The high-elasticity polymer shell expands and shrinks congruently with the expansion and shrinkage of the encapsulated core anode active material particle(s), enabling long-term cycling stability of a lithium battery featuring a high-capacity anode active material (such as Si, Sn, $SnO_2$, $Co_3O_4$, etc.).

The anode active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) prelithiated versions thereof; (g) particles of Li, Li alloy, or surface-stabilized Li; and (h) combinations thereof. Particles of Li or Li alloy (Li alloy containing from 0.1% to 10% by weight of Zn, Ag, Au, Mg, Ni, Ti, Fe, Co, or V element), particularly surface-stabilized Li particles (e.g. wax-coated Li particles), were found to be a good anode active material per se or an extra lithium source to compensate for the loss of Li ions that are otherwise supplied only from the cathode active material. The presence of these Li or Li-alloy particles encapsulated inside an elastomeric shell was found to significantly improve the cycling performance of a lithium cell.

Pre-lithiation of an anode active material can be conducted by several methods (chemical intercalation, ion implementation, and electrochemical intercalation). Among these, the electrochemical intercalation is the most effective. Lithium ions can be intercalated into non-Li elements (e.g. Si, Ge, and Sn) and compounds (e.g. $SnO_2$ and $Co_3O_4$) up to a weight percentage of 54.68% (see Table 1 below). For Zn, Mg, Ag, and Au encapsulated inside an elastomer shell, the amount of Li can reach 99% by weight.

TABLE 1

Lithium storage capacity of selected non-Li elements.

| Intercalated compound | Atomic weight of Li, g/mole | Atomic weight of active material, g/mole | Max. wt. % of Li |
|---|---|---|---|
| $Li_4Si$ | 6.941 | 28.086 | 49.71 |
| $Li_{4.4}Si$ | 6.941 | 28.086 | 54.68 |
| $Li_{4.4}Ge$ | 6.941 | 72.61 | 30.43 |
| $Li4.4Sn$ | 6.941 | 118.71 | 20.85 |
| $Li_3Cd$ | 6.941 | 112.411 | 14.86 |
| $Li_3Sb$ | 6.941 | 121.76 | 13.93 |
| $Li_{4.4}Pb$ | 6.941 | 207.2 | 13.00 |
| $LiZn$ | 6.941 | 65.39 | 7.45 |
| $Li_3Bi$ | 6.941 | 208.98 | 8.80 |

The particles of the anode active material may be in the form of a nano particle, nano wire, nano fiber, nano tube, nano sheet, nano platelet, nano disc, nano belt, nano ribbon, or nano horn. They can be non-lithiated (when incorporated into the anode active material layer) or pre-lithiated to a desired extent (up to the maximum capacity as allowed for a specific element or compound).

Preferably and typically, the high-elasticity polymer has a lithium ion conductivity no less than $10^{-6}$ S/cm, more preferably no less than $10^{-4}$ S/cm, further preferably no less than $10^{-3}$ S/cm, and most preferably no less than $10^{-2}$ S/cm. In some embodiments, the high-elasticity polymer is a neat polymer having no additive or filler dispersed therein. In others, the high-elasticity polymer is a polymer matrix composite containing from 0.1% to 50% (preferably 1% to 35%) by weight of a lithium ion-conducting additive dispersed in a UHMW polymer matrix material. The high-elasticity polymer must have a high elasticity (elastic deformation strain value >5%). An elastic deformation is a deformation that is fully recoverable and the recovery process is essentially instantaneous (no significant time delay). The high-elasticity polymer can exhibit an elastic deformation from 5% up to 300% (3 times of its original length), more typically from 10% to 100%, and further more typically from 10% to 50%. It may be noted that although a metal typically has a high ductility (i.e. can be extended to a large extent without breakage), the majority of the deformation is plastic deformation (non-recoverable) and only a small amount of elastic deformation (typically <1% and more typically <0.2%).

In some preferred embodiments, the high-elasticity polymer contains a select group of ultra-high molecular weight polymers that exhibit a unique combination of a high elasticity (high elastic deformation strain) and high lithium-ion conductivity. These UHMW polymers can contain a lithium salt to further increase the lithium ion conductivity. An UHMW polymer may also contain an electron-conducting material dispersed therein. Thus, the high-elasticity is preferably lithium ion-conducting and electron-conducting.

In certain preferred embodiments, the high-elasticity polymer contains an ultrahigh molecular weight (UHMW) polymer preferably selected from UHMW polyacrylonitrile (UHMW PAN), polyethylene oxide (UHMW PEO), polypropylene oxide (UHMW PPO), polyethylene glycol (UHMW PEG), polyvinyl alcohol (UHMW PVA), polyacrylamide (UHMW PAA), poly(methyl methacrylate) (UHMW PMMA), poly(methyl ether acrylate) (UHMW PMEA), a copolymer thereof, a sulfonated derivative thereof, a chemical derivative thereof, or a combination thereof.

The first step for producing encapsulated active material particles is to dissolve a UHMW polymer in a solvent to form a solution. Subsequently, particles of an anode active material (e.g. $SnO_2$ nano particles or Si nano-wires) can be dispersed in a polymer-solvent solution to form a suspension (also referred to as dispersion or slurry) of an active material particle-polymer mixture. This suspension can then be subjected to a solvent removal treatment while individual particles remain substantially separated from one another. The polymer precipitates out to deposit on surfaces of these active material particles. This can be accomplished, for instance, via spray drying, ultrasonic spraying, air-assisted spraying, aerosolization, and other secondary particle formation procedures.

One may also choose to add some lithium salt into the slurry. For instance, the procedure may begin with dissolving UHMW PVA in acetonitrile to form a solution. A lithium salt, $LiPF_6$, can then be added into the solution at a desired weight percentage. Then, particles of a selected anode active material are introduced into the mixture solution to form a slurry. The slurry may then be subjected to a micro-encapsulation procedure to produce anode active material particles coated with an embracing layer of UHMW PVA containing $LiPF_6$ dispersed therein (in the amorphous zones of the polymer).

The aforementioned high-elasticity polymers may be used alone to embrace or encapsulate anode active material particles. Alternatively, the high-elasticity polymer can be mixed with a broad array of elastomers, electrically conducting polymers, lithium ion-conducting materials, and/or strengthening materials (e.g. carbon nanotube, carbon nano-fiber, or graphene sheets).

A broad array of elastomers can be mixed with a high-elasticity polymer to encapsulate or embrace an anode active material particle or multiple particles. Encapsulation means substantially fully embracing the particle(s) without allowing the particle(s) to be in direct contact with electrolyte in the battery when the high-elasticity polymer is implemented in the anode of an actual battery. The elastomeric material may be selected from natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

In some embodiments, a high-elasticity polymer can form a polymer matrix composite containing a lithium ion-conducting additive dispersed in the high-elasticity polymer matrix material, wherein the lithium ion-conducting additive is selected from $Li_2CO_3$, $Li_2O$, $Li_2C_2O_4$, $LiOH$, $LiX$, $ROCO_2Li$, $HCOLi$, $ROLi$, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4.

In some embodiments, the high-elasticity polymer can be mixed with a lithium ion-conducting additive, which contains a lithium salt selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato) borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoro-ethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

The high-elasticity polymer may form a mixture or blend with an electron-conducting polymer selected from polyaniline, polypyrrole, polythiophene, polyfuran, a bi-cyclic polymer, derivatives thereof (e.g. sulfonated versions), or a combination thereof.

In some embodiments, the high-elasticity polymer may form a mixture or with a lithium ion-conducting polymer selected from non-UHMW poly(ethylene oxide) (PEO), Polypropylene oxide (PPO), poly(acrylonitrile) (PAN), poly (methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a derivative thereof (e.g. sulfonated versions), or a combination thereof. Non-UHMW polymers have a molecular weight lower than $0.5 \times 10^{-6}$ g/mole.

Although not desirable, the UHMW polymers may form a mixture with a rubber or elastomer. Unsaturated rubbers that can be vulcanized to become elastomer include natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), Some elastomers are saturated rubbers that cannot be cured by sulfur vulcanization; they are made into a rubbery or elastomeric material via different means: e.g. by having a copolymer domain that holds other linear chains together. Each of these elastomers can be used to encapsulate particles of an anode active material by one of several means: melt mixing (followed by pelletizing and ball-milling, for instance), solution mixing (dissolving the anode active material particles in an uncured polymer, monomer, or oligomer, with or without an organic solvent) followed by drying (e.g. spray drying), interfacial polymerization, or in situ polymerization of elastomer in the presence of anode active material particles.

Saturated rubbers and related elastomers in this category include EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, and protein elastin. Polyurethane and its copolymers (e.g. urea-urethane copolymer) are particularly useful elastomeric shell materials for encapsulating anode active material particles.

Several micro-encapsulation processes require the high-elasticity polymer or its precursor (monomer or oligomer) to be dissolvable in a solvent. Fortunately, all the high-elasticity polymers or their precursors used herein are soluble in some common solvents. The polymer or its precursor can be readily dissolved in a common organic solvent to form a solution. This solution can then be used to encapsulate solid particles via several of the micro-encapsulation methods to be discussed in what follows. Upon encapsulation, the shell (if containing precursor monomer or oligomer) is then polymerized.

There are three broad categories of micro-encapsulation methods that can be implemented to produce high-elasticity polymer-encapsulated particles of an anode active material: physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-coating method: The pan coating process involves tumbling the active material particles in a pan or a similar device while the encapsulating material (e.g. monomer/oligomer, polymer melt, polymer/solvent solution) is applied slowly until a desired encapsulating shell thickness is attained.

Air-suspension coating method: In the air suspension coating process, the solid particles (core material) are dispersed into the supporting air stream in an encapsulating chamber. A controlled stream of a polymer-solvent solution (polymer or its monomer or oligomer dissolved in a solvent; or its monomer or oligomer alone in a liquid state) is concurrently introduced into this chamber, allowing the solution to hit and coat the suspended particles. These suspended particles are encapsulated (fully coated) with a polymer or its precursor molecules while the volatile solvent is removed, leaving a very thin layer of polymer (or its precursor, which is cured/hardened subsequently) on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal extrusion: Anode active materials may be encapsulated using a rotating extrusion head containing concentric nozzles. In this process, a stream of core fluid (slurry containing particles of an anode active material dispersed in a solvent) is surrounded by a sheath of shell solution or melt. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle method: Core-shell encapsulation or matrix-encapsulation of an anode active material can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the anode active material. The solidification can be done according to the used gelation system with an internal gelation (e.g. sol-gel processing, melt) or an external (additional binder system, e.g. in a slurry).

Spray-drying: Spray drying may be used to encapsulate particles of an active material when the active material is dissolved or suspended in a melt or polymer solution. In spray drying, the liquid feed (solution or suspension) is atomized to form droplets which, upon contacts with hot gas, allow solvent to get vaporized and thin polymer shell to fully embrace the solid particles of the active material.

Coacervation-phase separation: This process consists of three steps carried out under continuous agitation:
(a) Formation of three immiscible chemical phases: liquid manufacturing vehicle phase, core material phase and encapsulation material phase. The core material is dispersed in a solution of the encapsulating polymer (or its monomer or oligomer). The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.
(b) Deposition of encapsulation shell material: core material being dispersed in the encapsulating polymer solution, encapsulating polymer material coated around core particles, and deposition of liquid polymer embracing around core particles by polymer adsorbed at the interface formed between core material and vehicle phase; and
(c) Hardening of encapsulating shell material: shell material being immiscible in vehicle phase and made rigid via thermal, cross-linking, or dissolution techniques.

Interfacial polycondensation and interfacial cross-linking: Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the anode active material and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form an elastomer shell material.

In-situ polymerization: In some micro-encapsulation processes, active materials particles are fully coated with a monomer or oligomer first. Then, direct polymerization and cross-linking of the monomer or oligomer is carried out on the surfaces of these material particles.

Matrix polymerization: This method involves dispersing and embedding a core material in a polymeric matrix during formation of the particles. This can be accomplished via spray-drying, in which the particles are formed by evaporation of the solvent from the matrix material. Another possible route is the notion that the solidification of the matrix is caused by a chemical change.

In the following examples, UHMW PEO, UHMW PPO, and UHMW PAN were used as three examples of UHMW polymers to illustrate the best mode of practice. Other UHMW polymers can be similarly used. These should not be construed as limiting the scope of invention.

Example 1: High-Elasticity Polymer-Protected Cobalt Oxide ($Co_3O_4$) Anode Particulates An appropriate amount of inorganic salts $Co(NO_3)_2 \cdot 6H_2O$ and ammonia solution ($NH_3 \cdot H_2O$, 25 wt. %) were mixed together. The resulting suspension was stirred for several hours under an argon flow to ensure a complete reaction. The obtained $Co(OH)_2$ precursor suspension was calcined at 450° C. in air for 2 h to form particles of the layered $Co_3O_4$. Portion of the $Co_3O_4$ particles was then encapsulated with UHMW PEO-based high-elasticity polymer according to the following procedure:

UHMW PEO was dissolved in DI-water (1.6 wt. %) to form a homogenous and clear solution first. Then, two routes were followed to prepare polymer-encapsulated $Co_3O_4$ particles. In the first route, $Co_3O_4$ particles were dispersed in the UHMW PEO-water solution to form a slurry. In some samples, 0.5%-5% of a conductive filler (e.g. graphene sheets) was added into the slurry. The slurries were separately spray-dried to form particulates of polymer-encapsulated $Co_3O_4$ particles.

In the second route, 1-45% of lithium salt ($LiClO_4$) was dissolved in the solution to form a series of lithium-salt containing solutions. Then, $Co_3O_4$ particles were dispersed in the lithium-containing UHMW PEO-water solution to form a series of slurries. In some samples, 0.5%-5% of a conductive filler (e.g. graphene sheets) was added into the slurry. Each slurry was spray-dried to form particulates of polymer- or polymer/lithium salt-encapsulated $Co_3O_4$ particles. The polymer or polymer/lithium salt shell can contain some conducting material (graphene sheets, in this case).

Some of the particulate samples were subsequently soaked in a solvent (preferably a desired lithium-ion battery electrolyte solvent such as ethylene carbonate, EC), allowing the solvent to permeate into the amorphous zones of the polymer phase embracing the anode particles. The UHMW polymer shell thickness was varied from 3.6 nm to 1.25 μm.

Figure 5A:
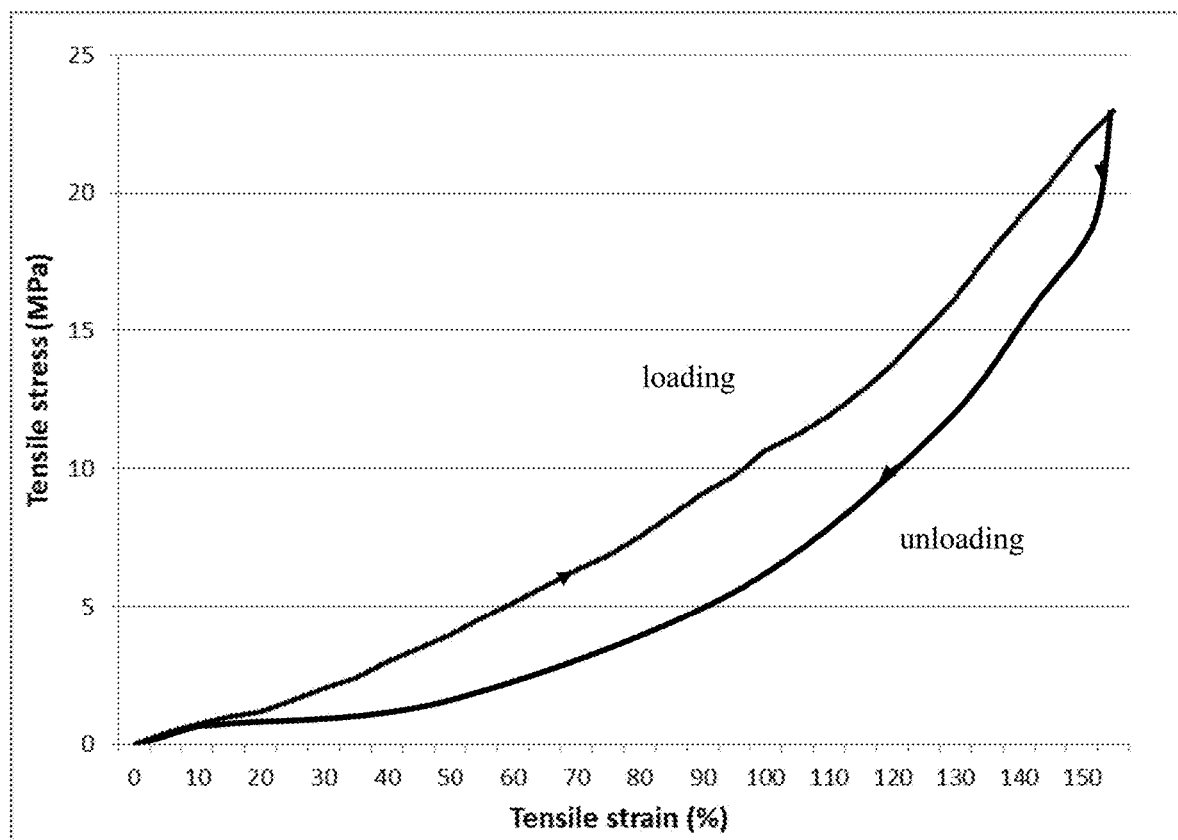
FIG. 5(A) The representative tensile stress-strain curve of UHMW PEO-EC polymer.

UHMW PEO-water solution was also cast onto glass surface and dried to form PEO films. Upon thorough drying, the polymer films were soaked in a desired solvent (e.g. EC) to form a rubber-like polymer. Several tensile testing specimens were cut from each polymer film containing a solvent (e.g. EC) and tested with a universal testing machine. The representative tensile stress-strain curves of polymers are shown in FIG. 5(A), which indicate that this polymer has an elastic deformation of approximately 150%. This value is for a neat polymer (containing some solvent) without any solid additive (no lithium salt and no conductive additive). The addition of up to 30% by weight of a lithium salt typically reduces this elasticity down to a reversible tensile strain from 5% to 60%.

For electrochemical testing, the working electrodes were prepared by mixing 85 wt. % active material (encapsulated or non-encapsulated particulates of $Co_3O_4$, separately), 7 wt. % acetylene black (Super-P), and 8 wt. % polyvinylidene fluoride (PVDF) binder dissolved in N-methyl-2-pyrrolidinoe (NMP) to form a slurry of 5 wt. % total solid content. After coating the slurries on Cu foil, the electrodes were dried at 120° C. in vacuum for 2 h to remove the solvent before pressing. Then, the electrodes were cut into a disk (φ=12 mm) and dried at 100° C. for 24 h in vacuum. Electrochemical measurements were carried out using CR2032 (3V) coin-type cells with lithium metal as the counter/reference electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using a CH-6 electrochemical workstation at a scanning rate of 1 mV/s.

The electrochemical performance of the particulates of high-elasticity polymer-encapsulated $Co_3O_4$ particles, elastomer-encapsulated $Co_3O_4$ particles and non-protected $Co_3O_4$ particles were evaluated by galvanostatic charge/discharge cycling at a current density of 50 mA/g, using a LAND electrochemical workstation. The results indicate that the charge/discharge profiles for the encapsulated $Co_3O_4$ particles and un-protected $Co_3O_4$ particle-based electrodes show a long voltage plateau at about 1.06 V and 1.10 V, respectively, followed by a slopping curve down to the cut-off voltage of 0.01 V, indicative of typical characteristics of voltage trends for the $Co_3O_4$ electrode.

Figure 5B:
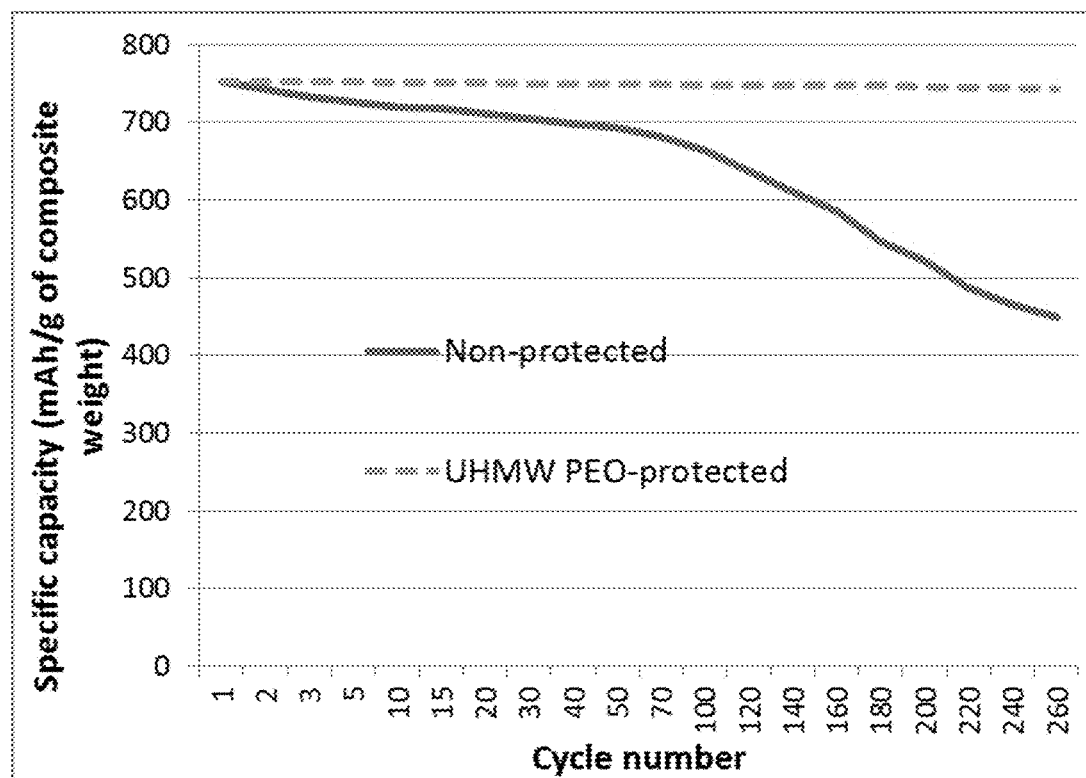
FIG. 5(B) The specific capacity values of three lithium battery having an anode active material featuring (1) UHMW PEO polymer-encapsulated $Co_3O_4$ particles, and (2) un-protected $Co_3O_4$ particles, respectively.

As summarized in FIG. 5(B), the first-cycle lithium insertion capacity values are 752 mAh/g (non-encapsulated) and 751 mAh/g (PEO polymer-encapsulated), respectively, which are higher than the theoretical values of graphite (372 mAh/g). As the number of cycles increases, the specific capacity of the bare $Co_3O_4$ electrode drops precipitously. Compared with its initial capacity value of approximately 752 mAh/g, the capacity suffers a 20% loss after 150 cycles and a 40.16% loss after 260 cycles. The presently invented high-elasticity polymer-encapsulated particulates provide the battery cell with very stable and high specific capacity for a large number of cycles, experiencing a capacity loss of 1.2% after 260 cycles. Furthermore, the UHMW PEO polymer exhibits a lithium ion conductivity ($4 \times 10^{-5}$-$5 \times 10^{-3}$ S/cm) comparable to those of liquid electrolytes. These data have clearly demonstrated the surprising and superior performance of the presently invented particulate electrode materials compared with prior art un-encapsulated particulate-based electrode materials.

It may be noted that the number of charge-discharge cycles at which the specific capacity decays to 80% of its initial value is commonly defined as the useful cycle life of a lithium-ion battery. Thus, the cycle life of the cell containing the non-encapsulated anode active material is approximately 150 cycles. In contrast, the cycle life of the presently invented cells (not just button cells, but large-scale full cells) is typically from 1,500 to 4,000.

Example 2: High-Elasticity Polymer-Encapsulated Tin Oxide Particulates

Tin oxide ($SnO_2$) nano particles were obtained by the controlled hydrolysis of $SnCl_4 \cdot 5H_2O$ with NaOH using the following procedure: $SnCl_4 \cdot 5H_2O$ (0.95 g, 2.7 m-mol) and NaOH (0.212 g, 5.3 m-mol) were dissolved in 50 mL of distilled water each. The NaOH solution was added dropwise under vigorous stirring to the tin chloride solution at a rate of 1 mL/min. This solution was homogenized by sonication for 5 m in. Subsequently, the resulting hydrosol was reacted with $H_2SO_4$. To this mixed solution, few drops of 0.1 M of $H_2SO_4$ were added to flocculate the product. The precipitated solid was collected by centrifugation, washed with water and ethanol, and dried in vacuum. The dried product, $SnO_2$ nano particles, was heat-treated at 400° C. for 2 h under Ar atmosphere.

The high-elasticity polymer for encapsulation of $SnO_2$ nano particles was based on ultra-high molecular weight polyacrylonitrile (UHMW PAN). UHMW PAN (0.3 g) was dissolved in 5 ml of dimethylformamide (DMF) to form a solution. The $SnO_2$ nano particles were then dispersed in the solution to form a slurry. The slurries were then separately subjected to a micro-encapsulation procedure to produce anode active material particles having entire exterior surfaces being coated with an embracing layer of the polymers.

Figure 6A:
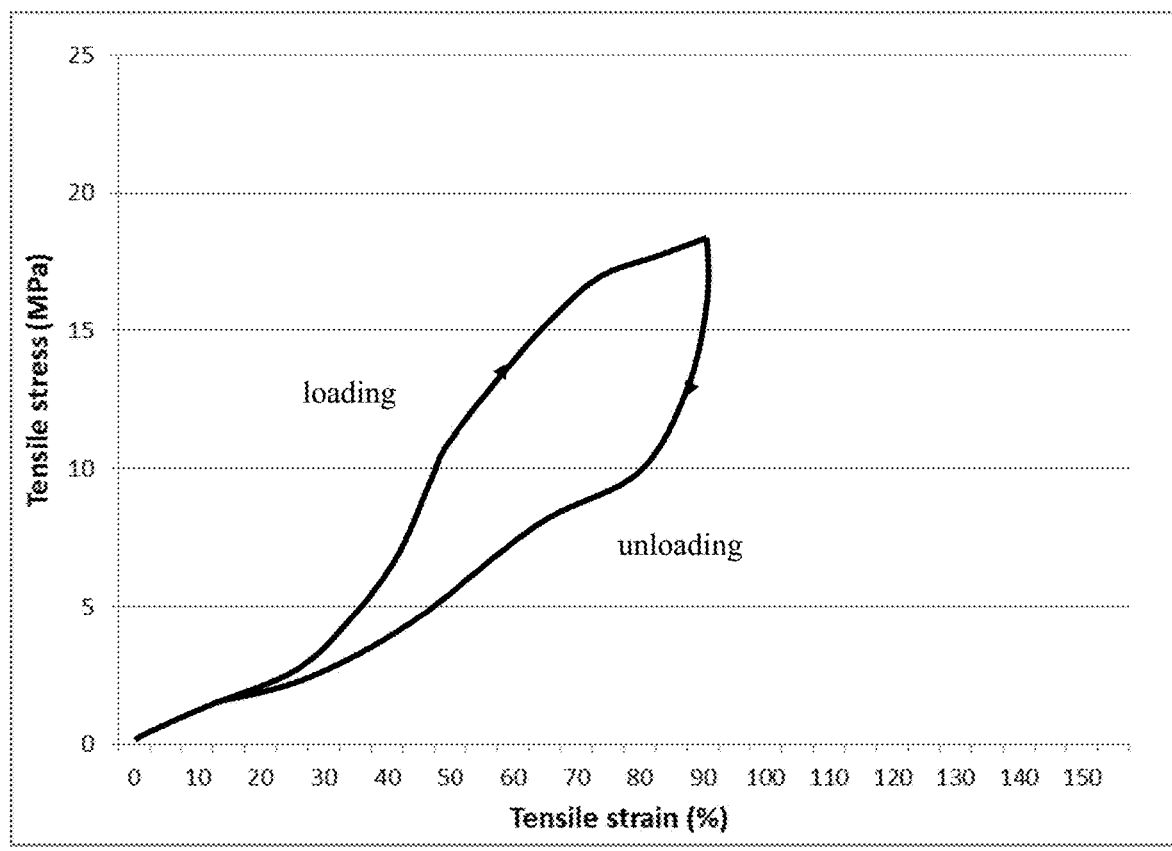
FIG. 6(A) The representative tensile stress-strain curves of UHMW PAN-PC polymer film.

Polymer films for elasticity testing were cast from the prepared solutions on a glass support, followed by solvent evaporation at 70° C. under a fume hood. To remove the traces of DMF, the films were thoroughly dried in a vacuum (<1 Torr) at 70° C. for 48 h. The polymer films were soaked in propylene carbonate (PC) to form PC-plasticized UHMW PAN films. Tensile testing was also conducted on these films and some testing results are summarized in FIG. 6(a). This series of polymers can be elastically stretched up to approximately 80%.

Figure 6B:
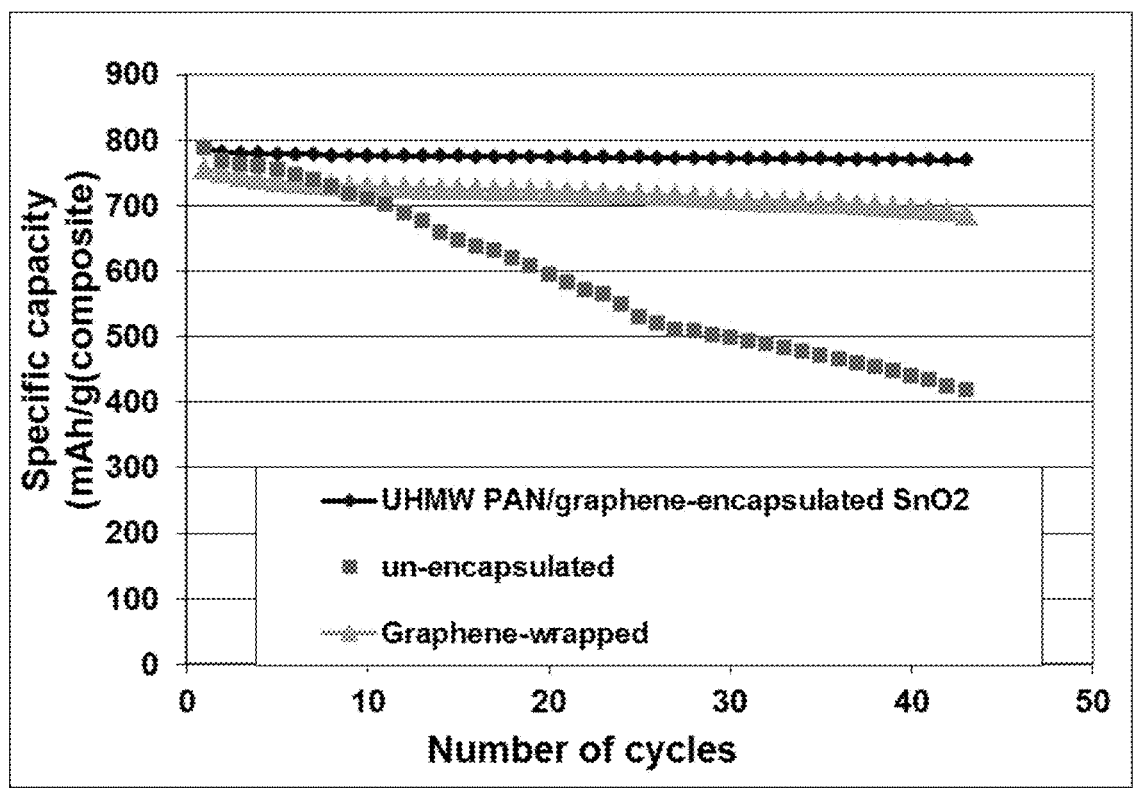
FIG. 6(B) The specific capacity values of three lithium battery having an anode active material featuring (1) high-elasticity polymer/graphene-encapsulated $SnO_2$ particles, (2) graphene-wrapped $SnO_2$ particles, and (3) un-protected $SnO_2$ particles, respectively.

The battery cells from the high-elasticity polymer-encapsulated particulates (nano-scaled $SnO_2$ particles) and non-coated $SnO_2$ particles were prepared using a procedure described in Example 1. FIG. 6(B) shows that the anode prepared according to the presently invented high-elasticity polymer-encapsulated particulate approach offers a significantly more stable and higher reversible capacity compared to both the un-coated $SnO_2$ particle-based anode and the graphene-wrapped $SnO_2$ particle-based anode. The approach of encapsulating the graphene-wrapped particles imparts a high level of cycle stability to the anode by preventing direct contact of liquid electrolyte with the anode active material and, thus, avoiding repeated SEI breakage and formation (the primary source of battery capacity decay).

Example 3: Tin (Sn) Nano Particles Encapsulated by an UHMW PPO-Based High-Elasticity Polymer For encapsulation of Sn nano particles, a procedure similar to that described in Example 1 was followed. For comparison, some amount of Sn nano particles was encapsulated by a carbon shell. Carbon encapsulation is well-known in the art. Un-protected Sn nano particles from the same batch were also investigated to determine and compare the cycling behaviors of the lithium-ion batteries containing these different types of particulates or bare particles as the anode active material.

Figure 7:
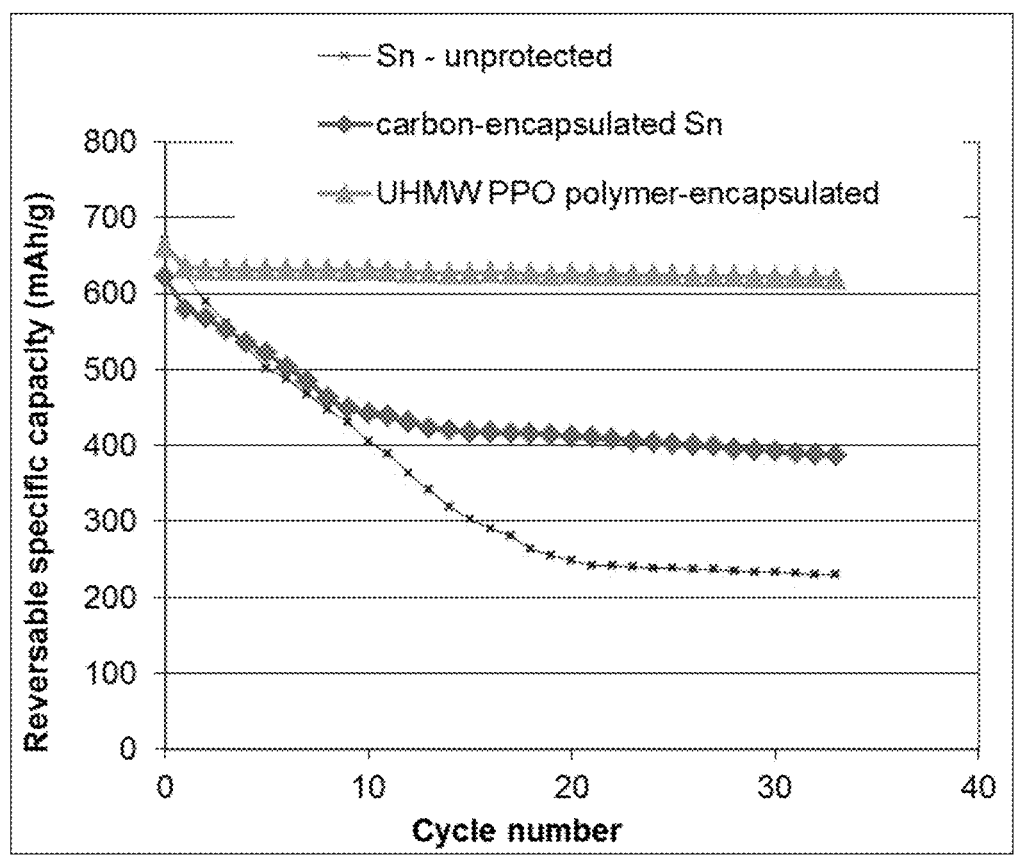
FIG. 7 The discharge capacity curves of three coin cells having three different types of Sn particulates (protected) or particles (un-protected) as the anode active material: high-elasticity polymer-encapsulated Sn particles, carbon-encapsulated Sn particles, and un-protected Sn particles.

Shown in FIG. 7 are the discharge capacity curves of three coin cells having three different types of Sn particulates (protected) or particles (un-protected) as the anode active material: high-elasticity UHMW PPO polymer-encapsulated Sn particles, carbon-encapsulated Sn particles, and un-protected Sn particles. These results have clearly demonstrated that carbon encapsulation is not effective in providing the necessary protection. The UHMW polymer strategy provides the most effective protection, enabling not only the highest reversible capacity but also the most stable cycling behavior.

Example 4: Si Nanowire-Based Particulates Protected by a High-Elasticity Polymer Si nano particles and Si nanowires Si nano particles are available from Angstron Energy Co. (Dayton, Ohio). Si nanowires, mixtures of Si and carbon, and their graphene sheet-embraced versions were further embraced with the UHMW PAN polymer.

Figure 8:
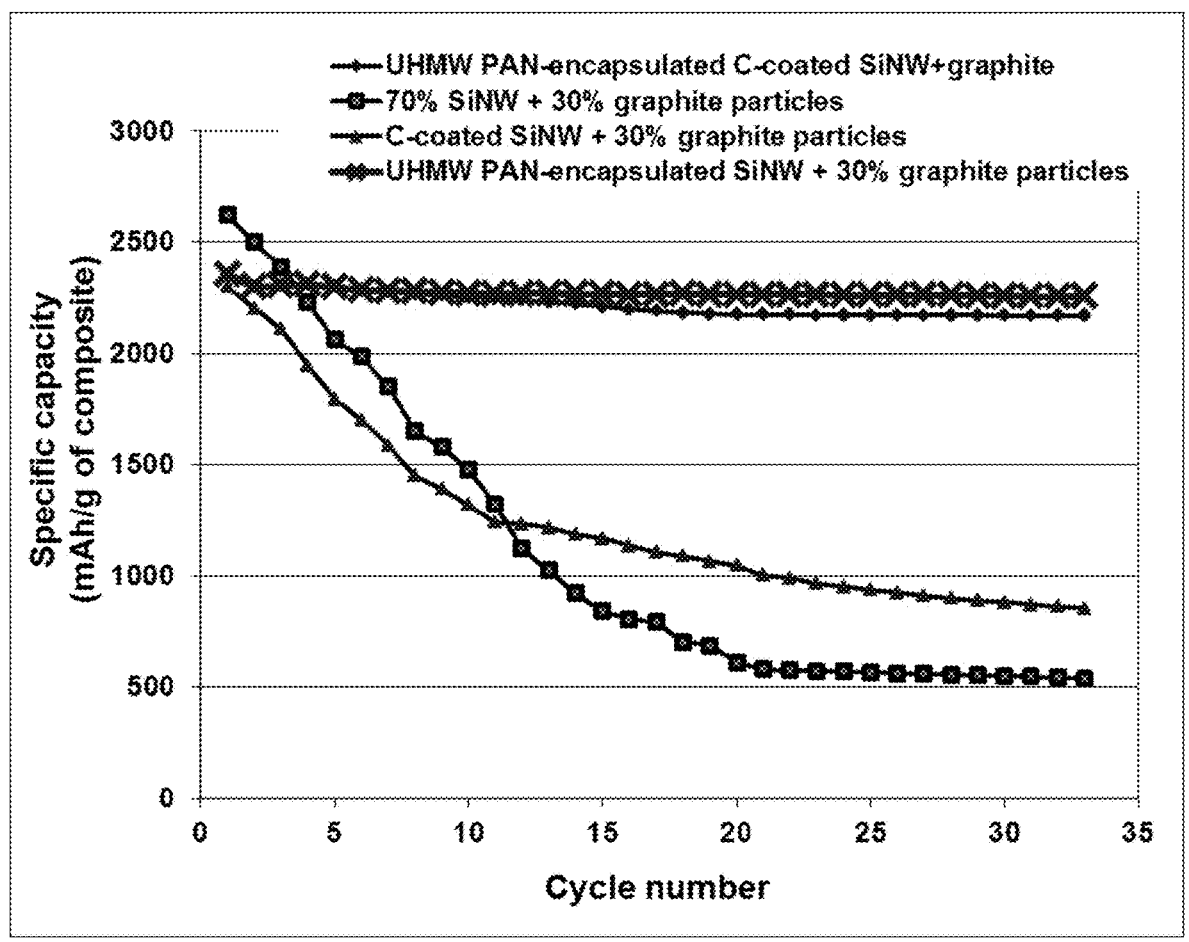
FIG. 8 Specific capacities of 4 lithium-ion cells having Si nanowires (SiNW) as an anode active material: unprotected SiNW, carbon-coated SiNW, high-elasticity polymer-encapsulated SiNW, and high-elasticity polymer-encapsulated carbon-coated SiNW.

Some Si nanowires were coated with a layer of amorphous carbon and then encapsulated with UHMW PAN. For comparison purposes, Si nanowires unprotected and those protected by carbon coating (but no polymer encapsulation), respectively, were also prepared and implemented in a separate lithium-ion cell. In all four cells, approximately 25-30% of graphite particles were mixed with the protected or unprotected Si nanowires (SiNW), along with 5% binder resin, to make an anode electrode. The cycling behaviors of these 4 cells are shown in FIG. 8, which indicates that UHMW polymer encapsulation of Si nanowires, with or without carbon coating, provides the most stable cycling response. Carbon coating alone does not help to improve cycling stability by much.

Example 5: Effect of Lithium Ion-Conducting Additive in a UHMW Polymer Shell

A wide variety of lithium ion-conducting additives were added to several different polymer matrix materials to prepare encapsulation shell materials for protecting core particles of an anode active material. We have discovered that these polymer composite materials are suitable encapsulation shell materials provided that their lithium ion conductivity at room temperature is no less than $10^{-6}$ S/cm. With these materials, lithium ions appear to be capable of readily diffusing in and out of the encapsulation shell having a thickness no greater than 1 μm. For thicker shells (e.g. 10 μm), a lithium ion conductivity at room temperature no less than $10^4$ S/cm would be required.

TABLE 2

Lithium ion conductivity of various UHMW polymer compositions as a shell material for protecting anode active material particles.

| Sample No. | Lithium-conducting additive | UHMW polymer + PC or EC (1-2 μm thick) | Li-ion conductivity (S/cm) |
|---|---|---|---|
| UE-1p | $Li_2CO_3 + (CH_2OCO_2Li)_2$ | 70-99% PEO | $2.2 \times 10^{-4}$ to $3.3 \times 10^{-3}$ S/cm |
| UE-2p | $Li_2CO_3 + (CH_2OCO_2Li)_2$ | 65-99% PAN | $4.7 \times 10^{-4}$ to $2.1 \times 10^{-3}$ S/cm |
| UE-3p | $Li_2CO_3 + (CH_2OCO_2Li)_2$ | 65-99% PEO + PPO | $8.4 \times 10^{-4}$ to $3.8 \times 10^{-3}$ S/cm |
| UD-4p | $Li_2CO_3 + (CH_2OCO_2Li)_2$ | 70-99% PMMA | $7.8 \times 10^{-5}$ to $2.3 \times 10^{-4}$ S/cm |
| UD-5p | $Li_2CO_3 + (CH_2OCO_2Li)_2$ | 75-99% PVA | $6.9 \times 10^{-5}$ to $1.2 \times 10^{-3}$ S/cm |
| UB1p | $LiF + LiOH + Li_2C_2O_4$ | 60-90% PVA | $8.7 \times 10^{-5}$ to $2.3 \times 10^{-3}$ S/cm |
| UB2p | LiF + HCOLi | 80-99% PVA | $3.8 \times 10^{-5}$ to $4.6 \times 10^{-4}$ S/cm |
| UB3p | LiOH | 70-99% PPO | $3.5 \times 10^{-3}$ to $1.2 \times 10^{-2}$ S/cm |
| UB4p | $Li_2CO_3$ | 70-99% PPO | $2.2 \times 10^{-3}$ to $9.5 \times 10^{-3}$ S/cm |
| UB5p | $Li_2C_2O_4$ | 70-99% PPO | $1.4 \times 10^{-3}$ to $1.2 \times 10^{-2}$ S/cm |
| UB6p | $Li_2CO_3$ + LiOH | 70-99% PEG | $1.5 \times 10^{-3}$ to $1.6 \times 10^{-2}$ S/cm |
| UC1p | $LiClO_4$ | 70-99% PEO | $4.6 \times 10^{-4}$ to $2.2 \times 10^{-3}$ S/cm |
| UC2p | $LiPF_6$ | 70-99% PEO | $3.4 \times 10^{-4}$ to $7.5 \times 10^{-3}$ S/cm |
| UC3p | $LiBF_4$ | 70-99% PAA | $1.1 \times 10^{-4}$ to $1.6 \times 10^{-3}$ S/cm |
| UC4p | $LiBOB + LiNO_3$ | 70-99% PMEA | $2.2 \times 10^{-4}$ to $4.3 \times 10^{-3}$ S/cm |
| US1p | Sulfonated polyaniline | 85-99% PAN | $5.8 \times 10^{-5}$ to $9.2 \times 10^{-4}$ S/cm |
| US2p | Sulfonated SBR | 85-99% PEO | $1.6 \times 10^{-4}$ to $1.2 \times 10^{-3}$ S/cm |
| US3p | Sulfonated PVDF | 80-99% PEG | $3.2 \times 10^{-4}$ to $2.3 \times 10^{-4}$ S/cm |

Example 6: Cycle Stability of Various Rechargeable Lithium Battery Cells

In lithium-ion battery industry, it is a common practice to define the cycle life of a battery as the number of charge-discharge cycles that the battery suffers 20% decay in capacity based on the initial capacity measured after the required electrochemical formation. Summarized in Table 3 below are the cycle life data of a broad array of batteries featuring presently invented UHMW polymer-encapsulated anode active material particles vs. other types of anode active materials.

TABLE 3

Cycle life data of various lithium secondary (rechargeable) batteries.

| Sample ID | Protective means | Type & % of anode active material | Initial capacity (mAh/g) | Cycle life (No. of cycles) |
|---|---|---|---|---|
| Si-1p | PEO encapsulation | 25% by wt. Si nano particles (80 nm) + 67% graphite + 8% binder | 1,120 | 1,555-2,150 |
| Si-2p | Carbon encapsulation | 25% by wt. Si nano particles (80 nm) | 1,242 | 251 |
| SiNW-1p | PEO encapsulation | 35% Si nanowires (diameter = 90 nm) | 1,252 | 2,467 |
| SiNW-2p | PEO+ 1% graphene sheets | 45% Si nano particles, pre-lithiated or non-prelithiated (no pre-Li) | 1,760 | 3,770 (pre-lithiated); 2,886 no prelithiation) |
| $VO_2$-1p | PAN encapsulation | 90%-95%, $VO_2$ nano ribbon | 255 | 3,020 |
| $Co_3O_4$-2p | PAN encapsulation | 85% $Co_3O_4$ + 8% graphite platelets + binder | 722 | 3,224 (Pre-lithiated); 2,223 (no pre-Li) |
| $Co_3O_4$-2p | No encapsulation | 85% $Co_3O_4$ + 8% graphite platelets + binder | 721 | 266 |
| $SnO_2$-2p | PPO encapsulation | 75% $SnO_2$ particles (3 μm initial size) | 741 | 1,677 |
| $SnO_2$-2p | PPO encapsulation | 75% $SnO_2$ particles (87 nm in diameter) | 738 | 4,334 (Pre-Li); 2,435 (non pre-Li) |
| Ge-1p | PPO encapsulated C-coated Ge | 85% Ge + 8% graphite platelets + binder | 852 | 2,320 |
| Ge-2p | Carbon-coated | 85% Ge + 8% graphite platelets + binder | 856 | 120 |
| Al—Li-1p | PEO encapsulation | Al/Li alloy (3/97) particles | 2,833 | 2,112 |
| Al—Li-2p | None | Al/Li alloy particles | 2,856 | 155 |
| Zn—Li-1p | PEO encapsulation | C-coated Zn/Li alloy (5/95) particles | 2,611 | 2,117 |
| Zn—Li-2p | None | C-coated Zn/Li alloy (5/95) particles | 2,631 | 146 |

These data further confirm the following features:
(1) The UHMW polymer encapsulation strategy is surprisingly effective in alleviating the anode expansion/shrinkage-induced capacity decay problems. Such a strategy appears to have significantly reduced or eliminated the possibility of repeated SEI formation that would other continue to consume electrolyte and active lithium ions.
(2) The encapsulation of high-capacity anode active material particles by carbon or other protective materials without high elasticity does not provide much benefit in terms of improving cycling stability of a lithium-ion battery.
(3) Pre-lithiation of the anode active material particles prior to encapsulation by an UHMW polymer is beneficial to retaining capacity.
(4) The UHMW polymer encapsulation approach is also surprisingly effective in imparting stability to lithium metal or its alloy when used as the anode active material of a lithium metal battery.

We claim:

1. A particulate of an anode active material for a lithium battery, said particulate comprising one or a plurality of anode active material particles being embraced or encapsulated by a thin layer of a polymer having a recoverable tensile strain no less than 5%, a lithium ion conductivity no less than $10^{-6}$ S/cm at room temperature, and a thickness from 0.5 nm to 10 μm, wherein said polymer contains an ultrahigh molecular weight polymer having a molecular weight from $0.5 \times 10^6$ to $9 \times 10^6$ grams/mole, wherein said ultrahigh molecular weight polymer is selected from polyacrylamide, poly(methyl ether acrylate), a copolymer thereof, a sulfonated derivative thereof, a chemical derivative thereof, or a combination thereof.

2. The particulate of claim 1, wherein said ultrahigh molecular weight polymer having a molecular weight from $0.5 \times 10^6$ to less than $5 \times 10^6$ grams/mole.

3. The particulate of claim 1, wherein said ultrahigh molecular weight polymer having a molecular weight from $1 \times 10^6$ to less than $3 \times 10^6$ grams/mole.

4. The particulate of claim 1, wherein said ultrahigh molecular weight polymer contains a lithium salt and/or a liquid solvent dispersed between chains of said ultrahigh molecular weight polymer.

5. The particulate of claim 1, wherein said ultrahigh molecular weight polymer contains an electrically conductive material dispersed therein.

6. The particulate of claim 5, wherein said electrically conducting material is selected from an electron-conducting polymer, a metal particle or wire, a graphene sheet, a carbon fiber, a graphite fiber, a carbon nano-fiber, a graphite nano-fiber, a carbon nanotube, a graphite particle, an expanded graphite flake, an acetylene black particle, or a combination thereof.

7. The particulate of claim 6, wherein said electrically conducting material has a thickness or diameter less than 100 nm.

8. The particulate of claim 4, wherein said liquid solvent is selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), propylene carbonate (PC), dimethyl carbonate (DMC), methylethyl carbonate (MEC), diethyl carbonate (DEC), ethyl propionate, methyl propionate, gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, an ionic liquid solvent, or a combination thereof.

9. The particulate of claim 4, wherein said lithium salt is selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoroethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

10. The particulate of claim 1, wherein said thin layer of said polymer has a thickness from 1 nm to 1 μm.

11. The particulate of claim 1, wherein said thin layer of said polymer has a thickness less than 100 nm.

12. The particulate of claim 1, wherein said thin layer of said polymer has a thickness less than 10 nm.

13. The particulate of claim 1, wherein said anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) prelithiated versions thereof; (g) particles of Li, Li alloy, or surface-stabilized Li having at least 60% by weight of lithium element therein; and (h) combinations thereof.

14. The particulate of claim 13, wherein said Li alloy contains from 0.1% to 10% by weight of a metal element selected from Zn, Ag, Au, Mg, Ni, Ti, Fe, Co, V, or a combination thereof.

15. The particulate of claim 1, wherein said anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, or a combination thereof, wherein x=1 to 2.

16. The particulate of claim 1, wherein said anode active material is in a form of nano particle, nano wire, nano fiber, nano tube, nano sheet, nano belt, nano ribbon, nano disc, nano platelet, or nano horn having a thickness or diameter from 0.5 nm to 100 nm.

17. The particulate of claim 1, wherein one or a plurality of said particles is coated with a layer of carbon or graphene disposed between said one or said plurality of particles and said polymer layer.

18. The particulate of claim 1, wherein said particulate further contains a graphite, graphene, or carbon material therein.

19. The particulate of claim 18, wherein said graphite or carbon material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof.

20. The particulate of claim 16, wherein said nano particle, nano wire, nano fiber, nano tube, nano sheet, nano belt, nano ribbon, nano disc, nano platelet, or nano horn is coated with or embraced by a conductive protective coating selected from a carbon material, graphene, electronically conductive polymer, conductive metal oxide, or conductive metal coating.

21. The particulate of claim 16, wherein said nano particle, nano wire, nano fiber, nano tube, nano sheet, nano belt, nano ribbon, nano disc, nano platelet, or nano horn is pre-intercalated or pre-doped with lithium ions to form a prelithiated anode active material having an amount of lithium from 0.1% to 54.7%% by weight of said prelithiated anode active material.

22. The particulate of claim 1, wherein said polymer has a lithium ion conductivity from $10^{-4}$ S/cm to $10^{-2}$ S/cm.

23. The particulate of claim 1, wherein said polymer is a neat polymer having no additive or filler dispersed therein.

24. The particulate of claim 1, wherein said polymer further contains from 0.1% to 50% by weight of a lithium ion-conducting additive dispersed therein, or contains therein from 0.1% by weight to 10% by weight of a reinforcement nano filament selected from carbon nanotube, carbon nano-fiber, graphene, or a combination thereof.

25. The particulate of claim 24, wherein said lithium ion-conducting additive is dispersed in said ultra-high molecular weight polymer and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4.

26. The particulate of claim 6, wherein said electron-conducting polymer is selected from polyaniline, polypyrrole, polythiophene, polyfuran, a bi-cyclic polymer, a sulfonated derivative thereof, or a combination thereof.

27. An anode active material layer containing multiple particulates of claim 1, an optional conductive additive, and an optional binder that bonds said multiple particulates together.

28. A lithium battery containing an optional anode current collector, the anode active material layer as defined in claim 27, a cathode active material layer, an optional cathode current collector, and an electrolyte and an optional porous separator in ionic contact with said anode active material layer and said cathode active material layer.

29. The lithium battery of claim 28, which is a lithium-ion battery, lithium metal battery, lithium-sulfur battery, lithium-selenium battery, or lithium-air battery.

30. A method of manufacturing a lithium battery with the particulate of an anode active material of claim 1, said method comprising:
(a) Providing a cathode and an optional cathode current collector to support said cathode;
(b) Providing an anode and an optional anode current collector to support said anode;
(c) Providing an electrolyte in contact with the anode and the cathode and an optional separator electrically separating the anode and the cathode;
wherein the operation of providing the anode includes providing multiple particulates of an anode active material, wherein a particulate is composed of one or a plurality of anode active material particles being embraced or encapsulated by a thin layer of a polymer having a recoverable tensile strain from 5% to 300% when measured without an additive or reinforcement, a lithium ion conductivity no less than $10^{-6}$ S/cm at room temperature, and a thickness from 0.5 nm to 10 μm, wherein said polymer contains an ultrahigh molecular weight polymer having a molecular weight from $0.5 \times 10^6$ to $9 \times 10^6$ grams/mole.

31. The method of claim 30, wherein said polymer has a thickness from 1 nm to 100 nm.

32. The method of claim 30, wherein said polymer has a lithium ion conductivity from $1 \times 10^{-5}$ S/cm to $2 \times 10^{-2}$ S/cm.

33. The method of claim 30, wherein said polymer has a recoverable tensile strain from 10% to 100%.

34. The method of claim 30, wherein said ultrahigh molecular weight polymer is selected from polyacrylonitrile, polyethylene oxide, polypropylene oxide, polyethylene glycol, polyvinyl alcohol, polyacrylamide, poly(methyl methacrylate), poly(methyl ether acrylate), a copolymer thereof, a sulfonated derivative thereof, a chemical derivative thereof, or a combination thereof.

35. The method of claim 30, wherein said ultrahigh molecular weight polymer has a molecular weight from $1 \times 10^6$ to less than $5 \times 10^6$ grams/mole.

36. The method e of claim 30, wherein said ultrahigh molecular weight polymer contains a lithium salt and/or a liquid solvent dispersed between chains of said ultrahigh molecular weight polymer.

37. The method of claim 30, wherein said ultrahigh molecular weight polymer is mixed with an electrically conductive material to form a polymer blend.

38. The method of claim 37, wherein said electrically conducting material is selected from an electron-conducting polymer, a metal particle or wire, a graphene sheet, a carbon fiber, a graphite fiber, a carbon nano-fiber, a graphite nano-fiber, a carbon nanotube, a graphite particle, an expanded graphite flake, an acetylene black particle, or a combination thereof.

39. The method of claim 30, wherein said providing multiple particulates includes encapsulating or embracing said one or a plurality of anode active material particles with said thin layer of said polymer using a procedure selected from pan coating, air suspension, centrifugal extrusion, vibrational nozzle, spray-drying, ultrasonic spraying, coacervation-phase separation, interfacial polycondensation, in-situ polymerization, matrix polymerization, or a combination thereof.

40. The method of claim 30, wherein said providing multiple particulates includes encapsulating or embracing said one or a plurality of anode active material particles with a mixture of said polymer with an elastomer, an electronically conductive polymer, a lithium-ion conducting material, a reinforcement material, or a combination thereof.

41. The method of claim 40, wherein said lithium ion-conducting material is dispersed in said polymer and is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4.

42. The method of claim 40, wherein said lithium ion-conducting material is dispersed in said polymer and is selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-meta-sulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoroethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

43. The method of claim 30, wherein said anode active material is selected from the group consisting of: (a) silicon (Si), germanium (Ge), tin (Sn), zinc (Zn), aluminum (Al), titanium (Ti), nickel (Ni), cobalt (Co), and cadmium (Cd); (b) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (c) lithium titanate, lithium manganate, lithium aluminate, lithium-containing titanium oxide, lithium transition metal oxide, $ZnCo_2O_4$; (d) prelithiated versions thereof; (e) mixtures thereof with a carbon, graphene, or graphite material; (f) particles of Li, Li alloy, or surface-stabilized Li having at least 60% by weight of lithium element therein; and (f) combinations thereof.

44. The method of claim 30, wherein said one or a plurality of anode active material particles is coated with a layer of carbon or graphene disposed between said one or said plurality of particles and said polymer layer.

45. The method of claim 30, wherein said one or a plurality of anode active material particles is mixed with a carbon, graphene, or graphite material to form a mixture and said mixture is embraced by one or a plurality of graphene sheets disposed between said mixture and said polymer layer.

46. The method of claim 30, wherein said one or plurality of anode active material particles are mixed with a carbon material, a graphite material, and/or graphene sheets to form a mixture that is embraced by external graphene sheets to form graphene-embraced anode active material particulates, which are then embraced or encapsulated by the polymer.

* * * * *